United States Patent [19]

Kanaiwa et al.

[11] 4,234,931
[45] Nov. 18, 1980

[54] INFORMATION OUTPUT APPARATUS FOR PUTTING OUT A CHARACTER DOT PATTERN

[75] Inventors: Kiyoshi Kanaiwa, Kawasaki; Kozo Matsumoto, Tokyo, both of Japan

[73] Assignee: Canon Kabushiki Kaisha, Tokyo, Japan

[21] Appl. No.: 933,048

[22] Filed: Aug. 11, 1978

[30] Foreign Application Priority Data

| Aug. 11, 1977 | [JP] | Japan | 52/96441 |
| Nov. 11, 1977 | [JP] | Japan | 52/135482 |
| Nov. 15, 1977 | [JP] | Japan | 52/136920 |
| Nov. 17, 1977 | [JP] | Japan | 52/138205 |

[51] Int. Cl.$^3$ ............... G06F 3/14; H04L 17/16; B41B 15/00

[52] U.S. Cl. ............. 364/900; 340/790; 340/799; 178/15; 178/30; 346/108; 354/5

[58] Field of Search ... 364/200 MS File, 900 MS File, 364/200, 900; 340/717, 724, 745, 748, 750, 790, 721; 178/15, 30

[56] References Cited

U.S. PATENT DOCUMENTS

| 3,848,232 | 11/1974 | Leibler et al. | 340/748 X |
| 4,007,442 | 2/1977 | Findley et al. | 364/900 |
| 4,059,833 | 11/1977 | Kitamura et al. | 364/900 X |
| 4,107,664 | 8/1978 | Marino | 340/750 X |

*Primary Examiner*—Raulfe B. Zache
*Attorney, Agent, or Firm*—Fitzpatrick, Cella, Harper & Scinto

[57] ABSTRACT

In reading out character dot patterns corresponding to character code signals from a dot pattern store therein a number of character dot patterns representing characters, there is provided a store therein position signals representing positions whereat the character dot patterns are stored in said dot pattern store, so that the position signals are first read out from the store by the character code signals and the corresponding character dot patterns are read out from said dot pattern store by the position signals.

20 Claims, 15 Drawing Figures

INFORMATION OUTPUT APPARATUS FOR PUTTING OUT A CHARACTER DOT PATTERN

BACKGROUND OF THE INVENTION

1. Field of the Invention

This invention relates to an information output apparatus of the type which is responsive to digitally coded input data to output (the term "output" used herein refers to the display on the screen and to the record on the recording medium) characters or any pattern corresponding to the coded data (hereinafter referred to "characters"), and more particularly to an information output apparatus in which the character display style, namely, the size, interval, display position and style of characters are of a variety and flexibility.

2. Description of the Prior Art

The information output apparatus of this type are becoming more and more important as a circumferential or terminal apparatus of the data processing equipment for computers or the like, and it is often required that the code data in the processing equipment be converted into forms which man can recognize, for example, the form of characters or the like. As an example of the information output device which satisfies such requirement, there has been used impact printing apparatus, such as line printer, which selects a character or other embossed mark corresponding to the input of character code and impacts a printable medium to accomplish printing. One of the disadvantages peculiar to such type of printing apparatus is that the diversity of the character display style is seriously limited, namely, that the number of character pieces in the printing apparatus is physically limited and replacement of character types with other selected sets of character pieces requires much time for which the printing operation must be interrupted.

Another disadvantage of the impact printer is that the character code applied as input and the character pieces in the printing apparatus normally have a construction corresponding to 1:1, so that the flexibility of the relation between the character codes and the printed characters is limited.

Also known is the non-impact information output apparatus is an ink jet type printing apparatus, but in this type of apparatus the above-noted limitations are not completely eliminated.

SUMMARY OF THE INVENTION

It is a primary object of the present invention to provide an information output apparatus which eliminates the above-noted disadvantages peculiar to the prior art and which abounds in variety and flexibility.

It is another object of the present invention to provide a display information output apparatus which enables characters having various different display styles to be displayed in the same page or in the same line.

It is still another object of the present invention to provide an information output apparatus which can flexibly deal with even the character code inputs of different character code systems.

It is yet still another object of the present invention to provide an information output apparatus having a construction which can very effectively utilize the area of a storage device within the apparatus for storing groups of character bit patterns and successively outputting character bit patterns corresponding to the character code inputs.

It is a further object of the present invention to provide an information output apparatus in which the character display style is not primarily limited by input character codes but which can display even the same character code input in a different character display style.

The invention will become more fully apparent from the following detailed description thereof taken in conjunction with the accompanying drawings.

DESCRIPTION OF THE PREFERRED EMBODIMENTS

Figure 4:
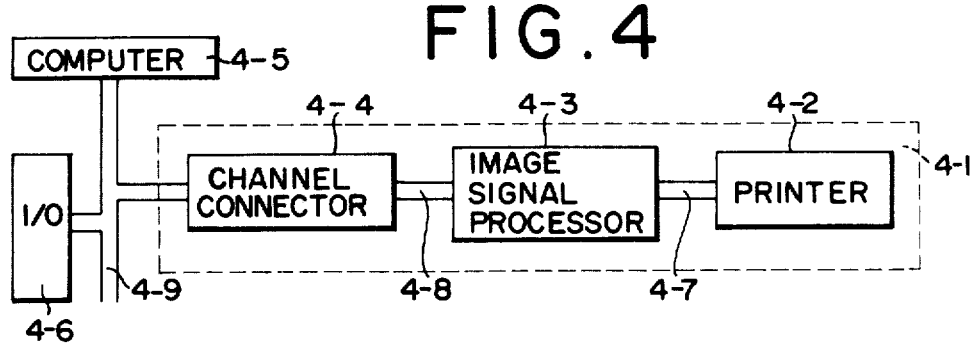
FIG. 4 is a block diagram showing the manner in which the information output apparatus of the present invention as a so-called on-line output apparatus is connected to a channel of a computer with other input and output apparatuses.
Figure 5:
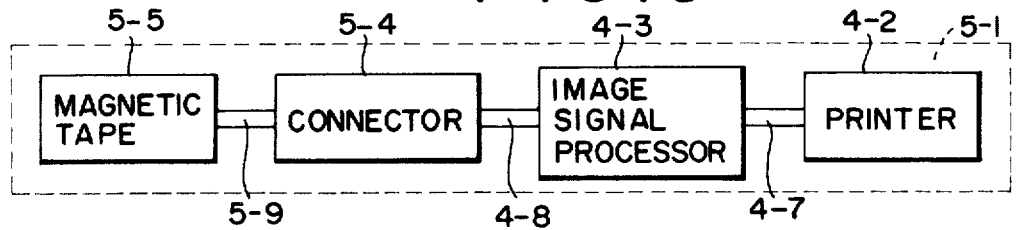
FIG. 5 is a block diagram showing the manner in which the information output apparatus of the present invention as a so-called off-line apparatus is coupled to a magnetic tape device.

Referring first to FIGS. 4 and 5, these show a preferred embodiment of the information output apparatus according to the present invention. FIG. 4 shows an embodiment of a so-called on-line printer. Designated by 4-5 is a well-known computer. There is a channel 4-9 of the computer 4-5 to which an on-line printer 4-1 according to the present invention is connected. Further, an input and output device 4-6, such as a magnetic tape device, a magnetic disk device, a card reader, a key operation panel and so on, is connected to the channel 4-9.

Channel connector 4-4 of the on-line printer 4-1 is connected to the channel 4-9. And the channel connector 4-4 is connected through a signal line 4-8 to an image signal processor 4-3, and the image signal processor 4-3 is connected through a signal line 4-7 to a printer 4-2.

The channel connector 4-4 receives a channel instruction word through the channel 4-9 from the computer 4-5, and then applies through the signal line 4-8 to the image signal processor 4-3 a character code information to be printed, a form control signal, a character bit pattern information, and other instructions necessary to a printing out. These performances are disclosed, for example, in U.S. Pat. No. 3,999,168 (Applicant; International Business Machines Corporation) and Japanese Open patent application Publication No. 71026/1976 (Corresponding to U.S. application Ser. No. 522,998).

An image signal processor 4-5 stores at least one page of various data applied from a second signal line 4-8, and assembles a picture plane of a page to be printed in accordance with control signal from the second signal line and horizontal and vertical synchronizing signal sent from a printer 4-2 through a third signal line 4-7, successively imparts a series of bit pattern signals of the picture plane to the printer 4-2 through the third signal line 4-7 and causes the printer 4-2 to display visible images on printing paper. By repeating the described operation, the image signal processor causes the printer 4-2 to repetitively put out the same picture plane or successively varying picture planes.

FIG. 5 shows an embodiment as a so-called off-line printer.

Generally designated by 5-1 is an off-line printer. The off-line printer 5-1 comprises a magnetic tape device 5-5, a magnetic tape device connector 5-4, an image signal processor 4-5, a printer 4-2, a first signal line 5-9, a second signal line 4-8, and a third signal line 4-7. The elements functionally similar to those shown in FIG. 4 are given similar reference characters.

The magnetic tape device 5-5 is of a well-known type which sets the magnetic tape put out in a computer system to thereby deliver character code data and necessary control information related to the print control information or the like to be described to the image signal processor 4-3 through the first signal line 5-9, the magnetic tape device connector 5-4 and the second signal line 4-8 in succession.

The magnetic tape device connector 5-4 receives data from the magnetic tape device through the first signal line to convert the data into a signal in a form which may be readily treated by the image signal processor 4-3, and deliver the converted data into the image signal processor 4-3 through the second signal line 4-8 while, at the same time, it receives the control signal from the image signal processor 4-3 through the second signal line 4-8 and delivers the same to the magnetic tape device 5-5 through the first signal line 5-9, thereby controlling the operation of the magnetic tape device 5-5. The magnetic tape device connector is usually commercially available under the name of formatter or magnetic tape control device.

In FIGS. 4 and 5, the printer 4-2, the image signal processor 4-3, the second signal line 4-8 and the third signal line 4-7 are given similar reference characters. This is because these are basically identical whether these parts take the form of an on-line printer or an off-line printer.

Depending on whether the second signal line 4-8 is connected to the channel connector 4-8 or to the magnetic tape device connector 5-4, the processing program in the image signal processor 4-3 and the control line in the second signal line 4-8 must be somewhat changed, but this does not pertain to the present invention and, if required, the channel connector 4-4 can be constructed so that it looks from the second signal line as if it were the magnetic tape device connector 5-4. By doing so, the second signal line 4-8 and so on may be made identical irrespective of the form of the on-line printer.

Figure 1:
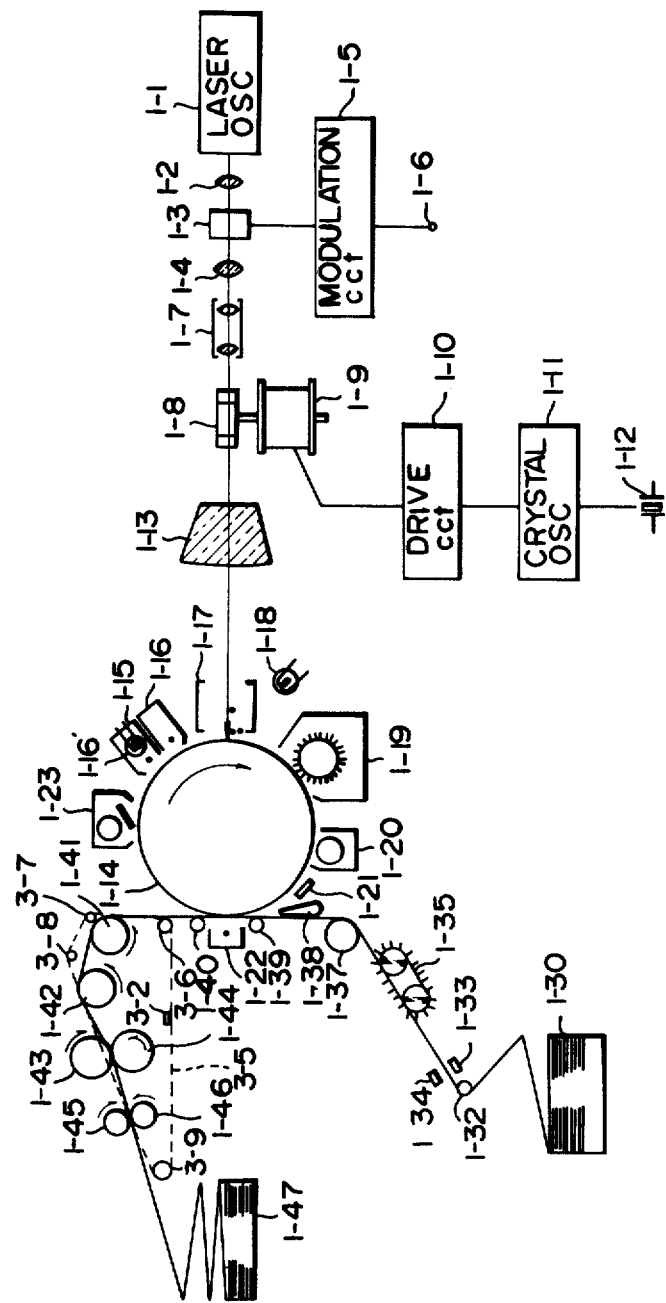
FIG. 1 schematically illustrates the construction of the printing portion applied to the present invention.
Figure 2:
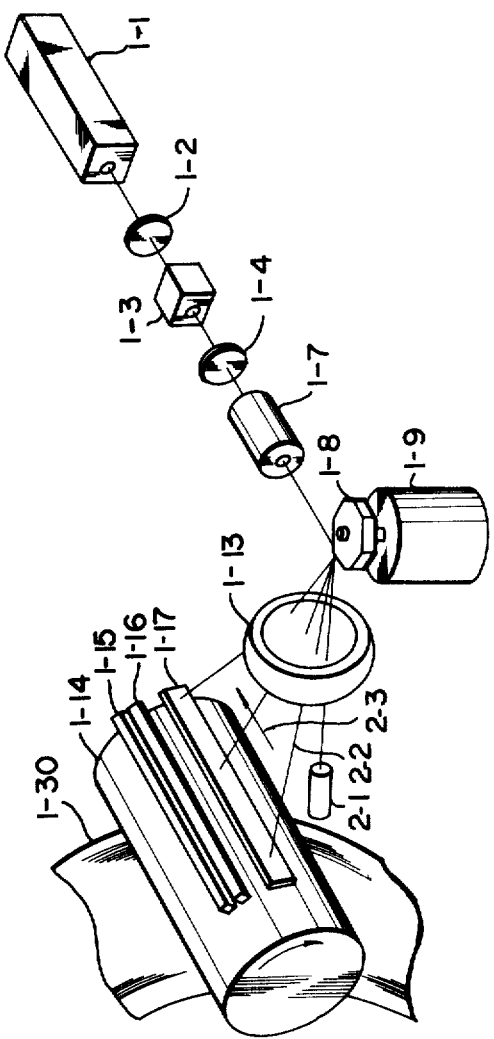
FIG. 2 is a perspective view showing the arrangement of an optical system included in FIG. 1.
Figure 3:
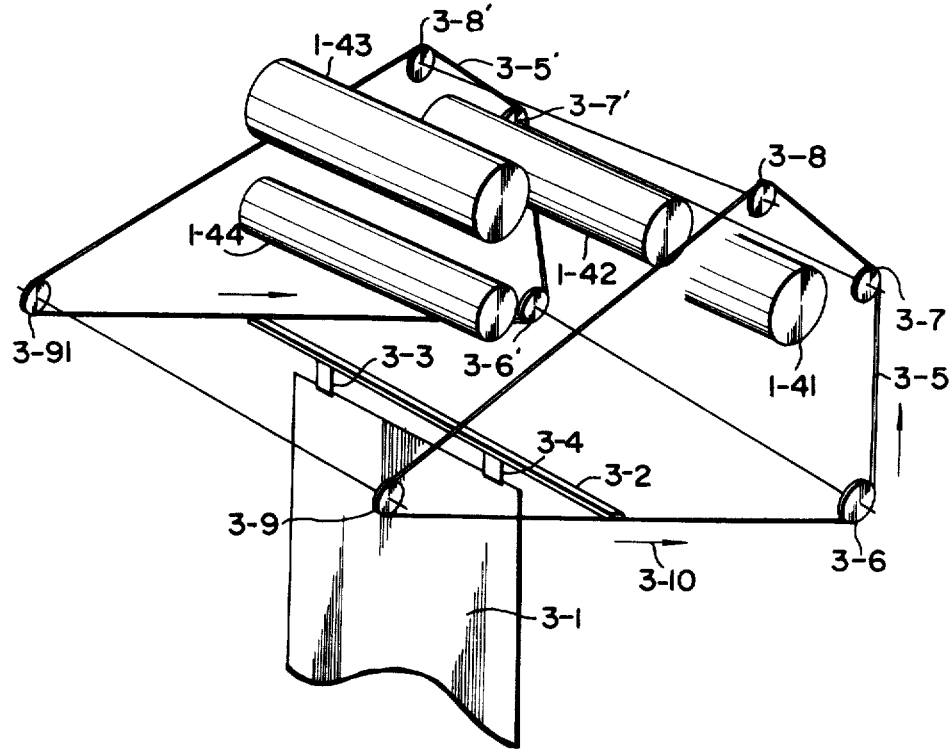
FIG. 3 is a perspective view showing a fixing device included in FIG. 1, particularly the automatic paper loading mechanism.

Reference is now had to FIGS. 1, 2 and 3 to fully describe the construction of the printer 4-2.

FIG. 1 schematically shows a basic construction of the present invention. A laser beam emitted from a laser oscillator 1-1 enters a light modulating system comprising a lens 1-2, an A/O modulating element 1-3 utilizing the well-known acousto-optical effect and a lens 1-4. The lens 1-2 functions to converge and project the laser beam onto a Bragg reflecting surface generated within the A/O modulating element, and the lens 1-4 functions to convert the laser beam diffracted and diverged by the Bragg reflecting surface into a parallel beam.

Where use is made of an E/O modulating element utilizing the known electro-optical effect, the lens 1-2 and the lens 1-4 are not necessary, and where the laser oscillator is a gas laser, a semiconductor laser or the like which permits current modulation, the light modulating system may of course be omitted.

The laser beam from the lens 1-4 becomes a parallel beam and enters a beam expander 1-7, in which the beam is expanded in diameter while remaining in the form of a parallel beam.

The laser beam having its beam diameter so expanded further passes into a rotatable polygon mirror having one or more mirror surfaces. The rotatable polygon mirror is mounted on a shaft supported by a precision bearing (for example, pneumatic bearing) and driven by a constant speed motor 1-9 (for example, hysteresis synchronous motor or DC servomotor). The laser beam horizontally swept by the rotatable polygon mirror 1-8 is imaged as a spot on a photosensitive drum 1-14 by an image formation lens 1-13 having a f-$\theta$ characteristic. In the usual image formation lens, when the angle of incidence of light is $\theta$, the position Y whereat the image is formed on the image plane is in the following relation: $Y = f \cdot \tan \theta \ldots$ (1) (where f: the focal length of the image formation lens). In the present embodiment, wherein the polygon mirror 1-8 is rotated at a constant speed, the reflected laser beam (2-2 in FIG. 2) varies its angle of incidence with time in the manner of linear function. Accordingly, the velocity of movement of the spot formed on the photosensitive drum 1-14 which is an image plane varies nonlinearly and is not constant. That is, the velocity of movement is increased at the points whereat the angle of incidence becomes greater. Therefore, if a row of spots is depicted on the photosensitive drum 1-14 by turning on the laser beam at a predetermined time interval, the intervals between the spots in the row are wider at the opposite ends than at the center. To avoid such phenomenon, the image formation lens is designed to have a characteristic as represented as follows:

$$Y = f \cdot \theta \qquad (2)$$

Such image formation lens 1-13 is hereinafter referred to as f−$\theta$ lens. Further, where a parallel beam is imaged as a spot by the image formation lens, the minimum diameter of the spot, dmin, is given as follows:

$$dmin = f(\lambda/A) \quad (3)$$

where
- f: the focal length of the lens,
- λ: the wavelength of the light used,
- A: the entrance opening of the lens.

When f and λ are constant, if A is increased, a smaller spot diameter dmin is obtained. The beam expander mentioned above is used to provide such an effect. Thus, where the necessary dmin can be obtained by the beam diameter of the laser oscillator, the beam expander 1-7 may be omitted.

The laser beam modulated as described (2-2 in FIG. 2) is projected upon the photosensitive drum 1-14, and the drum is developed by the electrophotographic treating process and the developed image is transferred to plain paper, which is fixed and put out as a hard copy. An example of the electrophotographic process used with the present invention is shown in our Japanese Pat. No. 23910/1967, wherein the insulating layer surface of the photosensitive drum 1-14 basically comprising a conductive back-up member, a photoconductive layer and an insulating layer is uniformly charged to the positive or the negative polarity by a first corona charger 1-16 to cause charge of opposite polarity to the charge by the charge to be trapped in the interface between the photoconductive layer and the insulating layer or in the interior of the photoconductive layer, whereafter the charge insulating layer surface is irradiated with the laser beam and simultaneously therewith, subjected to AC corona discharge from an AC corona discharger 1-17 to form a pattern on the insulating layer surface due to the surface potential difference resulting from the light and dark pattern of the laser beam, and then the whole surface of the insulating layer is uniformly exposed to the light from a whole surface exposure lamp 1-18 to form an electrostatic latent image of high contrast on the insulating layer surface. Further, the electrostatic latent image is developed into a visible image by a developing device 1-19 with the aid of charged toner particles, whereafter the visible image is transferred to fan-fold paper (hereinafter referred to as paper) by a transfer charger 1-22, the paper being brought into intimate contact with the photosensitive drum 1-14 by a means to be described, and then the transferred image is fixed by a fixing means to be described, thus providing an electrophotographic print image. On the other hand, after the image transfer has been done, the insulating layer surface is cleaned by a cleaning device 1-23 to remove any remaining charged particles to render the photosensitive drum ready for reuse.

As a further embodiment, use may be made of the electrophotographic electrostatic image formation process as disclosed in our Japanese Pat. No. 19748/1967. The insulating layer surface of a photosensitive plate basically comprising a conductive back-up member, a photoconductive layer and an insulating layer is uniformly charged to the positive or the negative polarity by first corona discharge to cause charge of the opposite polarity to the charge by said discharge to be trapped in the interface between the photoconductive layer and the insulating layer or in the interior of the photoconductive layer, and the charged surface is further subjected to AC corona discharge to attenuate the charge on the insulating layer surface, whereafter the insulating surface is irradiated with the laser beam as information signal to form on the insulating layer surface an electrostatic latent image corresponding to the light and dark of the laser beam, whereafter the electrostatic image is developed and subjected to the same process as those in the above-described first embodiment.

Denoted by 1-15 is a predischarging charger, and 1-16 is a pre-exposure lamp. The predischarging charger 1-15 renders the surface potential of the photosensitive drum 1-14 constant and uniform and the pre-exposure lamp 16 renders the characteristic of the photosensitive layer constant and uniform. These cooperate with each other to erase various histories remaining on the photosensitive drum 1-14 passed through the cleaning device 1-23, for example, the remaining potential on the drum, and are useful to ensure obtainment of stable images.

We have already proposed an electrostatic latent image stabilizing method in our Japanese Patent Application No. 111562/1976 U.S. application Ser. No. 832,984) as the means for ensuring obtainment of stable and good images in the electrophotographic process used with the present embodiment.

Designated by 1-21 is an electrostatic potentiometer for realizing such means. It provides a light portion and a dark portion to the photosensitive drum 1-14, the light portion being the portion scanned by and exposed to the laser beam, and measures the electrostatic potential in each of the portions.

Denoted by 1-20 is a carrier removing device which prevents the carrier present in the developer within the developing device from being deposited on the photosensitive drum 1-14 and accordingly on the paper or from mixing with the cleaning device 1-23.

FIG. 2 cubically illustrates the arrangement of the optical system of FIG. 1, and the parts functionally similar to those in FIG. 1 are given similar reference characters. (This also holds true in the ensuring description).

In FIG. 2, the part designated by 2-1 comprises a small entrance slit and a quickly responsive photoelectric converter element (for example, PIN diode). The scanning start position of the laser beam 2-2 swept is detected by a beam detector and this detection generates a horizontal synchronous signal after the lapse of a predetermined time and determines the timing for starting of the modulation control signal for imparting desired light information onto the photosensitive drum 1-14, as will further be described.

In FIG. 2, the scanning direction of the laser beam 2-2 is indicated by arrow 2-3.

Description will now be made of the conveyance of printing paper (hereinafter referred to as paper). Designated by 1-30 is unprinted paper usually used for the output of a computer or the like and formed with feed perforations at the opposite side edges thereof.

Denoted by 1-32 is a holding bar provided to help smooth conveyance of the paper. Designated by 1-33 is a light source such as light-emitting diode, 1-34 a light receptor such as photodiode, and 1-33 and 1-34 a trailing end detector for detecting the trailing end of the paper.

Designated by 1-35 is a known tractor having pins arranged for engagement with the feed perforations. The pins are rotated by rotation of an unshown tractor shaft to convey the paper. Denoted by 1-37 is a guide roller for the conveyance of the paper.

Reference character 1-38 denotes a separating pawl for separating the paper from the photosensitive drum 1-14. As will later be described, the paper is urged against the photosensitive drum 1-14 by the operation of transfer rollers 1-39 and 1-40 and brought into intimate contact with the drum 1-14 by the operation of transfer charger 1-22, and when the image transfer is done and the operation of the transfer charger 1-22 is stopped, the paper tends to stick to the drum 1-14 in spite of the transfer rollers 1-39 and 1-40 having been separated from the drum 1-14. The separating pawl is useful to separate such paper from the drum 1-14.

Designated by 1-39 and 1-40 are the transfer rollers operated in the same direction to urge the paper against the photosensitive drum 1-14.

Denoted by 1-41 is a guide roller for absorbing the tension imparted to the paper during the conveyance thereof when the tension is greatly varied beyond a prescribed value. A hollow cylindrically shaped pre-heating roller 1-42 has a heater or like heat source in the center of the cylinder, and with a fixing roller 1-43 for fixing the toner transferred to the paper and a back-up roller 1-44, the roller 1-42 constitutes a fixing device.

Designated by 1-43 is a hollow cylindrically shaped fixing roller having a heater or like heat source in the center of the cylinder. Designated by 1-44 is a back-up roller for urging the paper having the toner transferred thereto against the fixing roller 1-43 and for facilitating heat transfer from the fixing roller 1-43 to the toner and the paper and for imparting a high pressure to the toner to aid in the fixation of the toner.

Designated by 1-45 and 1-46 are discharge rollers for discharging the paper after fixation. Reference character 1-47 denotes the paper on which printing has already been effected.

FIG. 3 cubically illustrates an automatic loading mechanism for setting the paper to a portion comprising the guide roller 1-41, the pre-heating roller 1-42, the fixing roller 1-45, the back-up roller 1-44 and the discharge rollers 1-45 and 1-46. In the operative condition, the pre-heating roller 1-42, the fixing roller 1-43 and the back-up roller 1-44 are at high temperatures about 180° C. and so, it is very difficult for a person to manually set the paper and therefore an automatic loading mechanism is required. In FIG. 3, the discharge rollers 1-45 and 1-46 are not shown since these are equivalent in function to the fixing roller 1-43 and the back-up roller 1-44.

In FIG. 3, the paper is designated by 3-1. Denoted by 3-2 is a movable bar secured to the opposite ends of chains 3-5 and 3-5' and provided with paper holding portions 3-3 and 3-4. Designated by 3-5 is a chain, and denoted by 3-6, 3-7, 3-8 and 3-9 are gears engaged by the chain 3-5. Denoted by 3-6', 3-7', 3-8' and 3-9' are gears engaged by the chain 3-5'.

The cube encircled by the chain 3-5 and gears 3-6, 3-7, 3-8 and 3-9 and by the chain 3-5' and gears 3-6', 3-7', 3-8' and 3-9' is designed such that in the case of paper setting, it encloses the roller 1-41, the pre-heating roller 1-42 and the back-up roller 1-44 but not the fixing roller 1-45.

In such state, if the end of the paper is nipped between the holding members 3-3 and 3-4 and the chains 3-5 and 3-5' are moved round in the direction of arrow 3-10 by an unshown drive source to make one round, the paper is set while passing through the clearance between the fixing roller 1-43 and the back-up roller 1-44.

Although the discharge rollers 1-45 and 1-46 are not shown in FIG. 3, if it is considered that these discharge rollers 1-45 and 1-46 correspond to the fixing roller 1-43 and the back-up roller 1-44, respectively, then it is apparent that the paper can be set from the roller 1-41 through the discharge rollers 1-45 and 1-46.

In FIG. 1, the positions of the movable bar 3-2, chain 3-5, gears 3-6, 3-7, 3-8 and 3-9 are shown.

In the above-described operation, the fixing roller 1-43 and the discharge roller 1-45 escape upwardly to provide clearance and for the operation to be described, the transfer rollers 1-39 and 1-40, the transfer charger 1-22 and the guide roller 1-37 have their respective axes set to positions substantially orthogonal to the center axis of the photosensitive drum 1-14 by an unshown mechanism.

Subsequently, the feed perforations of the paper are engaged with the pins of the tractor 1-34, whereafter the tractor is moved round by an unshown operating member to set the perforations of the paper to the transfer position.

Next, the transfer charger 1-22 is set to the shown position, namely, the charging wire of the transfer charger 1-22 is parallel to the axis of the photosensitive drum 1-14 and the axes of the transfer rollers 1-39, 1-40 and the guide roller 1-37 are likewise positioned so that the paper is positioned with an interval of several millimeters from the position in which the paper is urged against the photosensitive drum 1-14, thus being set to a wait position. The fixing roller 1-43 and the back-up roller 1-44 are held at a position having an interval as described and not so as to contact the paper, and the preheating roller 1-42 is also held at a position in which it makes no contact with the paper.

The laser beam from the laser oscillator 1-1 is modulated by the modulator element 1-3 to which the modulating control signal applied from the input terminal 1-6, as will be described, is applied through modulation circuit 1-5, and is scanned while being imaged on the surface of the photosensitive drum 1-14 by the deflecting action of the rotatable polygon mirror 1-8. The rotatably polygon mirror 1-8 is driven at a constant speed by the driving output from a driving circuit 1-10 to which the output of a crystal oscillation circuit 1-11 including a crystal oscillator 1-12 is applied. The line printing position to the paper is adjusted by generating a horizontal synchronous signal after the lapse of a predetermined time from the point of time whereat the signal from the beam detector 2-1 provided so as to correspond to the scanning start position of the deflected laser beam is generated and by applying a modulation control signal generated in accordance with said horizontal synchronous signal.

The aforementioned predetermined time can be digitally set by the use of a suitable clock signal and by a counter, and may also be set by a one-shot multivibrator. It is also possible to use a clock signal source such as locked oscillator which starts oscillation in response to the signal from the beam detector 2-1.

In the above-described means, the left margin can be set and displayed in distance, e.g., unit of millimeter, by relating the oscillation frequency of clock signal or locked oscillator or like signal source to the scanning speed of the laser beam.

The paper starts to be moved by the tractor 1-35 in relation to the point of time whereat the recording on the surface of the photosensitive drum 1-14 is started.

Generally, the printing position in the direction of row with respect to the perforations of the paper may be arbitrary and accordingly, during the movement of the paper, TOP signal (vertical synchronous signal) which provides the reference of the start of recording is put out each time n horizontal synchronous signals are put out.

Thus, the conveyance of the paper is started after the lapse of time $\tau_1$ from the point of time whereat the TOP signal is generated till the time when the laser beam scanning position of the photosensitive drum 1-14 reaches the transfer position to the paper after a predetermined time determined by the peripheral speed of the photosensitive drum 1-14.

As will apparent from the foregoing description, the printing position in the direction of row with respect to the paper may be adjusted by varying the time $\tau_1$ from the point of time whereat the TOP signal is generated till the point of time whereat the conveyance of the paper is started. As such adjust means, the means similar to the column direction adjust means may be used.

The transfer rollers 1-39 and 1-40 further advance from their wait position toward the photosensitive drum 1-14 to urge the paper against the photosensitive drum 1-14, correspondingly to the time point whereat the conveyance of the paper is started.

Substantially simultaneously therewith, the transfer charger 1-22 starts operation to effect the transfer of image to the paper.

Also, substantially simultaneously with the start of conveyance of the paper, the fixing roller 1-43 and the back-up roller 1-44 start rotating while pressure-contacting each other to fix the toner transferred to the paper and convey the paper. The paper advances and is conveyed now by the discharger rollers 1-45 and 1-46, thus providing a printed copy 1-47.

Stoppage of the paper will now be described. The paper is stopped by the tractor 1-35, the fixing roller 1-43 and the back-up roller 1-44 being stopped substantially at the same point of time. In this case, the paper is controlled in operation time so that the perforations are coincident with the transfer position, and the paper is ready for the printing. The fixing roller 1-43 and the back-up roller are displaced out of contact with the paper thereafter, and the preheating roller 1-42 is also displaced to a similar position. The transfer roller 1-39 and 1-40 are displaced to their wait position and the separating pawl becomes operative to separate the paper from the surface of the photosensitive drum 1-14 and the transfer charger becomes inoperative. The photosensitive drum is rotating within a predetermined time $\tau_2$ from the point of time whereat the conveyance of the paper takes place and is ready to print within time $\tau_2$. After the lapse of the time $\tau_2$, the photosensitive drum rotates for a predetermined time $\tau_3$ and makes the electrophotographic process conditions constant during this time.

If the unprinted paper becomes exhausted, when the trailing end of the paper passes by the trailing end detector comprising a light source 1-35 and a light receptor 1-34, the light from the light source 1-53 reaches the light receptor 1-34 and the resulting signal stops the conveyance of the paper.

The foregoing description has been made with respect to the case where the printing portion 4-2 comprises a printer. However, the printing portion 4-2 is not restricted to a printer but may be a well-known long-time luminescent type or storage type cathode ray tube or a display device provided with a refresh storage device and using a cathode ray tube or a plasma display device, as is readily apparent.

Description will now be fully made of the construction of the image signal processor 4-3 shown in FIG. 4 or 5.

The ensuing description of such processor 4-3 will be more clearly understood by referring to our U.S. Pat. No. 4,059,833.

Figure 6:
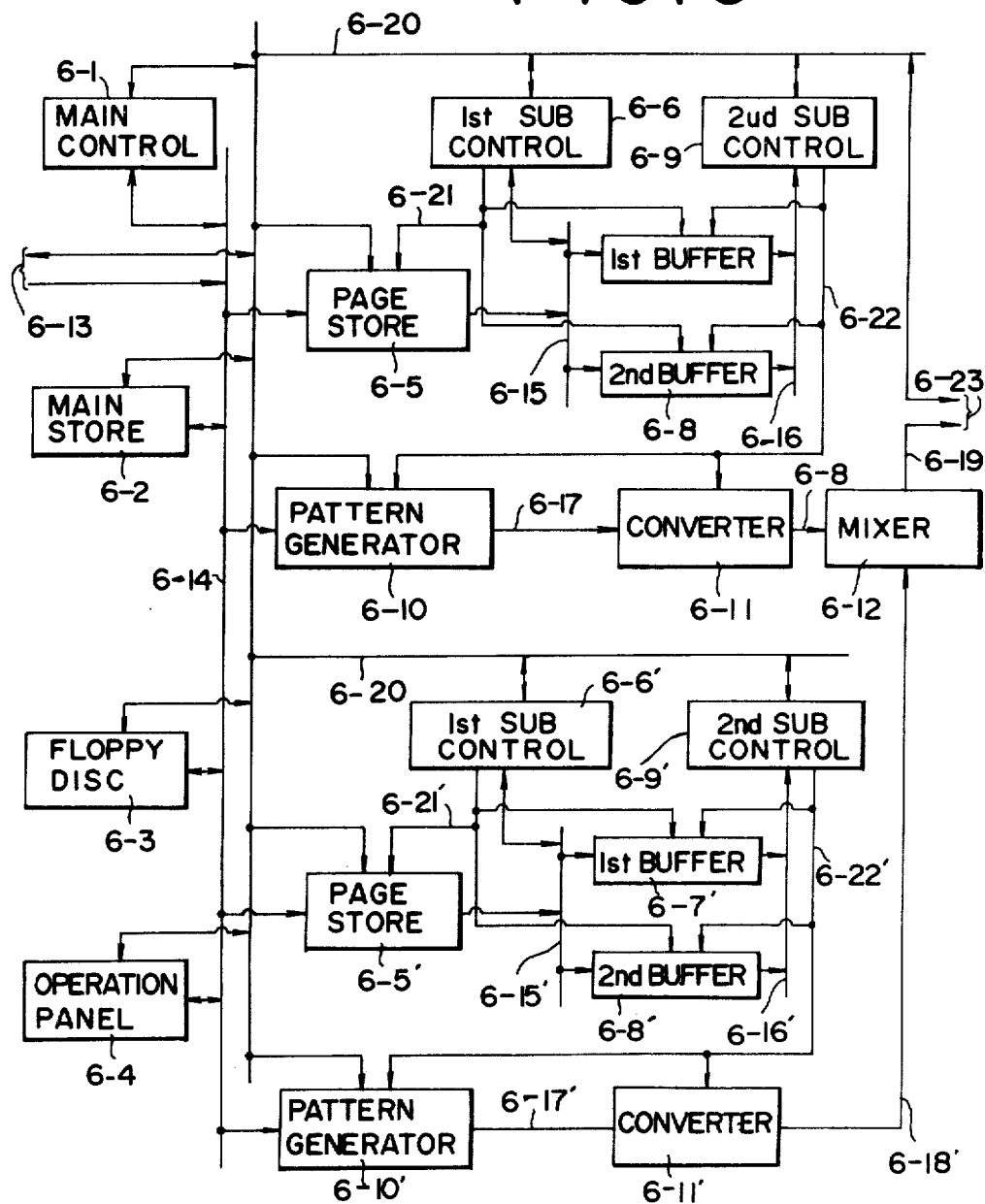
FIG. 6 is a block diagram showing the image signal processing portion shown in FIG. 4 or 5.

FIG. 6 shows the internal structure of the image signal processor 4-3.

The second signal line 4-8 is connected to the data input terminal 6-13 and the third signal line 4-7 is connected to the print data output terminal 6-23.

Within the image signal processor 4-3, a first data line 6-14 and a first control line 6-20 are connected to the data input terminal 6-13.

In the present embodiment, of characters or other patterns (hereinafter referred to "characters") to be printed, data put out as the result of the computer processing, namely, a character code group which is an aggregation of character codes (hereinafter sometimes referred to variable data) is applied to the data input terminal 6-13 through the second signal line 4-8.

On the other hand, of the characters to be printed, a character code group corresponding to the image of a format of "the paper printed with forms" used with the well-known impact printers (hereinafter sometimes referred to as fixed data or form information) is applied to the data input terminal 6-13 through the second signal line 4-8 or generated by a floppy disc device 6-3 included in the image signal processor 4-3.

Within the image signal processor 4-3, the variable data and the fixed data received by the first data line 6-14 is delivered into a main store device 6-2 under the control of a main control device 6-1.

The main control device 6-1 includes a direct memory access mechanism for transferring the data from the data input terminal 6-13 or the floppy disc device 6-3 to the main store device 6-2 or for transferring the data from the main store device 6-2 to page store devices 6-5, 6-5' and rewritable character generating devices 6-10, 6-10'.

The rewritable character generating devices 6-10 and 6-10' will now be described. Such devices, like the variable pattern generator 18 disclosed in our U.S. Pat. No. 4,081,604, can write bit pattern information and can present the address storing the so written bit pattern, thereby put out the bit pattern.

The main control device 6-1 performs control of the following five jobs to cause the printer 4-2 to generate desired images.

1. Introducing the data from the data input terminal 6-13 into the main store device 6-2.
2. Introducing the data from the floppy disc device 6-3 into the main store device 6-2.
3. Taking out character code groups from within the main store device and transferring the same to the page store device 6-5 or 6-5'.
4. Taking out character bit pattern groups and index table of the character bit patterns from within the main store device and transferring such index table to the page store device 6-5 or 6-5' and transferring the character bit pattern groups to the rewritable character generator 6-10 or 6-10'.

5. Giving and taking the command necessary for the image signal processor 4-3 to operate between the data input terminal 6-13, the floppy disc device 6-3, an operating panel 6-4 for manually applying information input, a first sub-control device 6-6 or 6-6', a second subcontrol device 6-9 or 6-9' and the printer 4-2 and controlling these devices to cause the printer 4-2 to generate desired images.

The numbers given the prime (') means that there are two devices each having the same function, and the unprimed numbers designate the system for treating chiefly the fixed data and the primed numbers designate the system for treating chiefly the variable data.

The information introduced from the data input terminal 6-13 or the floppy disc device 6-3 is generally grouped into the following five types.

1. form information
2. print control information
3. character bit pattern information
4. character code group
5. special control command The "form information" is the information which determines that the images printed are related to the format and this information includes the form control information corresponding to the known carriage control tape in the usual impact printers, namely, the information about the line position on the recording medium, line pitch designating information which designates the pitch of each print line, print position control information for controlling the horizontal print position of images depending on which address of the line buffer, to be described, is loaded with the address within the rewritable character generator corresponding to the character to be printed, mask position designating information for designating the characters to be masked so that when the masking is designated by print control information, a portion of printed characters is changed, for example, deleted to replace it by a blank character and to achieve the same effect as carbon papers which are printed in the ordinary impact line printer, character display style change designating information for effecting designation of the change of the internal character code so that when the transfer of character codes from the main store device to the page store device takes place to cause printing to be effected in different style or different size of characters for the same character code, a suitable number is added to or subtracted from the character codes to cause access to character bit pattern of different character display style in another address within the rewritable character generator, paper information for designating the vertical length of a page of the paper to be printed, namely, the length of the fanhold paper used with the ordinary line printer between the adjacent perforations, form image character code group for assembling images corresponding to the format printing, form number information for distinctly designating different types of form information, and character bit pattern information number designating information for designating a specific set out of a plurality of sets of character bit pattern information used for form images printed in accordance with form information.

Form information is usually written into the main store device 6-2 from the floppy disc device 6-3 prior to the series of printing operations during which printing is effected in the same format. Of course, it is also possible to introduce the form information from the data input terminal 6-13 as in the case of the other data.

Next, the "print control information" is the information for controlling the mode of the print output and includes form number designating information for designating in which format the printing is to be effected, in other words, which form information is to be used to effect printing, page number designating information for designating how many sheets of the same page are to be put out, file number designating information for designating how many sets of the same file are to be put out, mask designating information for designating whether masking is to be effected or not, and reduced scale designating information for designating whether the printing is to be effected on a reduced scale.

Print control information is written into the main store device 6-2 and interpreted and executed by the main control device 6-1 prior to the series of printing operations during which printing is effected in the same format.

The print control information is normally given by the operating panel 6-4 but it is also possible to give such information from the data input terminal 6-13 as is the other data or to give such information from the floppy disc device 6-3.

By applying the print control information from the data input terminal 6-13 prior to the other data, it is possible to automate the operation of the image signal processor 4-3 of the present embodiment.

The "character bit pattern information" includes the information providing the content of the rewritable character generator which is used for the fixed data and the variable data, namely, sets of character bit patterns corresponding to respective character codes and arranged in successive bits for a necessary number of characters and suitably arranged (hereinafter referred to as bit pattern group). For example, assume that a character A corresponding to character code 41 (this 41 is a sextodecimal number) is formed by $24 \times 30$ dots and that a character A is depicted by the laser beam scanning 30 times such as Ln1, Ln2, ..., Lnm. Then, the information corresponding to the first scanning line Ln1 is 24 dots (24 bits) and therefore, the information of Ln1 is represented as logic 0 or 1 signal. Consequently, in the case of the character shown in FIG. 12, one character is expressed as a bit pattern of $4 \times 30 = 120$ bites. Further, the character bit pattern information includes, in addition to the character bit pattern groups which are the main information of this type, character bit pattern information number information for designating the character bit information pattern information distinctly from the other character bit pattern information, character generator address information for causing the addresses of the character bit patterns in the rewritable character generator to correspond to the respective character codes, and character generator index table (hereinafter referred to as CG index table) which comprises character display style designating information as will further be described.

The character bit pattern information is entered from the floppy disc device 6-3 or the data input terminal 6-13 before the printing operation is started, and once written in the main store device 6-2 under the control of the main control device 6-1, whereafter it is read out from the main store device 6-2 and if the character bit pattern information is a bit pattern group to be used for the printing of the fixed data, it is loaded into the rewritable character generator 6-10, and if the character bit pattern information is a bit pattern group to be used for the printing of the variable data, it is loaded into the rewritable character generator 6-10'. At this time, the CG index table is loaded into a portion of the page store device 6-5 if it is for the fixed data, and loaded into a portion of the page store device 6-5' if it is for the variable data.

The "character code group" is the printing data itself which comprises character codes for assembling the images to be printed, and may be, for example, ASCII code. A portion of the character code group includes command codes for designating the line space and print lines.

The character code group for effecting the printing of the fixed data is normally treated as part of form information.

The "special control command" causes the main control device 6-1 to discriminate between various types of information and gives the discriminating information necessary for the treatments corresponding to the respective contents to be performed.

Figure 7:
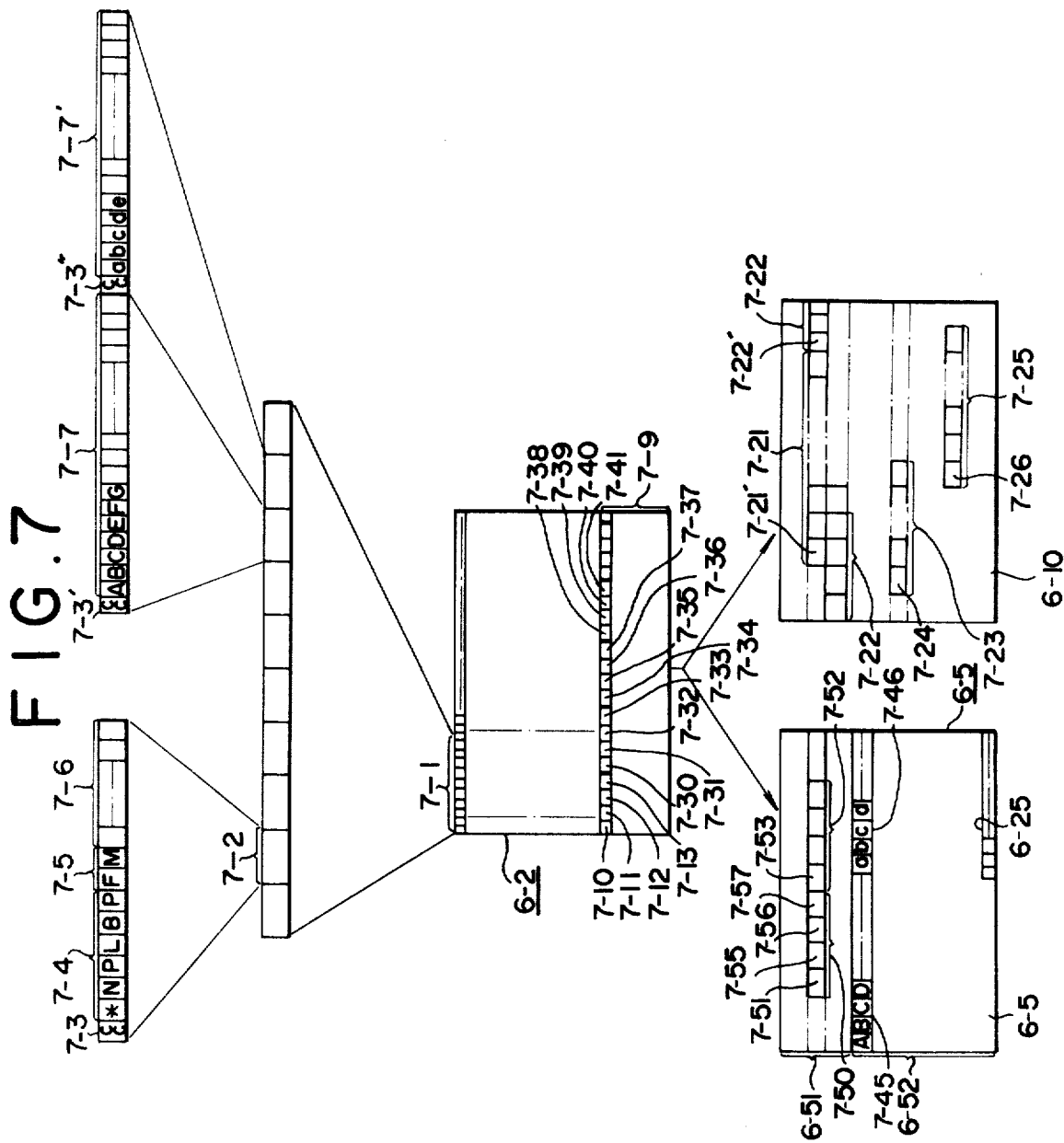
FIG. 7 illustrates the information applied as input from the data input terminal of FIG. 6 or the floppy disc device to the image signal processing portion and the flow of information thereafter.

Description will now be made of the content and flow of the information written from the data input terminal 6-13 or the floppy disc device 6-3 into the main store device 6-2. FIG. 7 shows a mode of the information written into the main store device 6-2 and it is a unit of amount of information known as one block.

One block of information 7-1 comprises an aggregation of one or more units of information called 1 record, and one record of information 7-2 in turn comprises a plurality of bites of codes.

The number of code bites in 1 record and the number of codes in 1 block are various at present.

The aggregations 7-3, 7-4, 7-5 and 7-6 of the code bites show examples of the content of the 1 record code 7-2. 7-3 designates a commande code, 7-4 a special control command code, 7-5, a information discriminating code, and 7-6 control information.

The command code 7-3 is identical in purpose and function to that used in the well-known printer and it is for designating the number of line spaces or the print lines.

In FIG. 7, the command code is shown as 1 bite, but sometimes a plurality of bites is used to designate the number of code bites in 1 record and even the number of records in one block if the record is a leading record.

The command code 7-3, if the next special control code 7-4 is present, loses its function of designating the print lines. For example, if the content of the code 7-4 is an arrangement of character codes "NPLBP", the 7-4 is regarded as a special control command code, and the record recognized as the special control command code 7-4 and the succeeding record are treated as the information by the special control command until a record including the special control command code designating the end of the special control command appears.

The information distinguished from the character codes of the variable data by the special control command is form information, print control information and character bit pattern information. These types of information are further discriminated by the information discriminating code 7-5 as to whether they are form information, print control information or character bit pattern information.

If the information is one for designating the form information, the character code of, for example, "FM" is used as the information discriminating code. If the record is form information, code bites of form number information, paper length designating information, character bit pattern number designating information, form control information, line pitch designating information, print position control information, mask position designating information, character display style change designating information, etc. are arranged as the control information 7-6, and the character code group for the form image for assembling an image corresponding to the format printing, namely, the fixed data, is arranged.

1 record 7-2 usually stores therein information of one line to be printed and comprises a bite number corresponding to one line plus the bite number of command code. For example, it is 137 bites. Therefore, the control information 7-6 is not usually contained in 1 record. Accordingly, in the present case, a necessary number of records is used for the control information and is followed by an arrangement of records of character code groups of the fixed data.

As another example of the record, there is shown an arrangement in which character code group 7-7 follows the command code 7-3'.

For example, the content of the code 7-3' is the command "print by spacing 1 line" and the succeeding character code group to be recorded is stored in an order in which they are to be recorded.

The input information entered from the data input terminal 6-13 or the floppy disc device 6-3 is (block, and a suitable number of blocks following the 1 block is written into the main store device 6-2.

In the present embodiment, an area corresponding to 2 blocks is secured within the main store device 6-2 and, after 1 block of information has been written in, the 1 block of information is read by the main control device 6-1 and effects a treatment corresponding to the content thereof, while at the same time a new 1 block of information is written into the remaining 1 block area. If the writing of the new 1 block is terminated after the treatment of the first 1 block has been terminated, the main control device 6-1 effects the treatment corresponding to the content of the new 1 block and during that while, still a further new 1 block is written into the previous 1 block area.

Thus, writing and reading of the information is alternately effected for each of the two block areas within the main store device 6-2 and as the reading treatment progresses, new blocks of information are successively stored in the main store device 6-2.

The 1 block of information read out from the main store device 6-2 is subjected to treatment corresponding to the content thereof by the main control device 6-2. That is, if the information is the print control information, the control information necessary to execute the content thereof is put out from the main control device 6-1 and delivered through the first control line 6-20 to the first sub-control device 6-6 or 6-6', the second sub-control device 6-9 or 6-9', the operating panel 6-4, the floppy disc device 6-3, and the printer 4-2. If the information is the form information, then the form number information, the paper length information, the character bit pattern information, the number designating information, the form control information, the line pitch designating information, the printing position control information, the mask position designating information and the character display style change designating information are transferred to other storage positions within the main store device 6-2 so that the reference can be had to those data when printing is effected, and the form image character code group, i.e. fixed data is stored in the memory area (character code portion 6-52) within the page store device 6-5 in an order in which recording is to be effected.

When the fixed data is transferred from the main store device 6-2 to the page store device 6-5, the command code belonging to each record is interpreted, and the address representing the position within the page store device at which the leading bite of the line unit character codes is stored in a page store device index table (hereinafter referred to as PM index table) provided at a specific storage position within the main store device 6-2, in an order corresponding to the line, together with the line number of the record and the line pitch designating information of that line number. Control is likewise effected on the variable data, but for simplicity of description, the fixed data is only described.

In the PM index table 9, the leading bite address of a blank line 6-25 pre-stored in the page store device 6-5 and the line pitch designating information of the blank line are stored as required, in addition to the line leading bite address of each record within the page store device 6-5 and the line pitch designating information. A blank line refers to a line in which character codes designating character bit pattern containing no black dot (namely, blank characters) are arranged in a number of bites corresponding to one line. (Such a technique is disclosed in our Japanese patent application No. 20491/1976 (U.S. Counterpart Ser. No. 771,467)).

If, for example, a command "print by spacing three lines" is present at the top of a certain character bit pattern, the leading bite address and the line pitch designating information of said blank line 6-25 within the page store device 6-5 are first stored two times in the PM index table 7-9 and thereafter, the leading bite address and the line pitch designating information of that record are stored under the control of the main control device.

Thus, within the PM index table 7-9, the command code is interpreted while the address and line pitch designating information within the page store device 6-5 of the printed line and the blank line are arranged in the same manner as the actual construction of the printed line and a table is formed by the line leading bite address and the line pitch designating information of more than one line.

For example, assume that the command code "print by spacing one line" is stored in the 7-3' of the main store device as shown in FIG. 7, and then a line of ASCII codes 41, 42, 43, 44, ... corresponding to characters A, B, C, D, ... are stored, whereafter the command "print by spacing one line" is stored in the 7-31 and then a line of ASCII codes 61, 62, 63, 64, ... corresponding to a, b, c, d, ... are stored. Such data is read out and stored in the page store device 6-5 and during such reading, the PM index table is prepared by the main control device. First, the command "space one line" in the area 7-3' is read out and the line pitch signal of the blank line is stored in a 1-bite area 7-10, while the leading bite address (comprising three bites) of the blank line 6-25 is stored in the areas 7-11 to 7-13 each consisting of 1 bite area. Next, the character codes in the area 7-7 are read out and written into the area 7-45 by an address counter included in the first sub-control device 6-6 while, at the same time, the leading bite address of the area 7-45 (which comprises three bites) is stored in the areas 7-11 to 7-13.

Likewise, the area 7-3" is read out and the line pitch designating signal of the blank line is stored in the area 7-34 while, at the same time, the leading bite address of the blank line 6-25 is stored in the areas 7-35 to 7-37 each comprising 1 bite area. Next, the character codes in the area 7-7' are successively read out and written into the area 7-46 while, at the same time, the leading bite address of the area 7-46 is stored in the areas 7-38 to 7-40.

By successively reading out the information from the main store device in this manner, a table of line leading bite addresses and line pitch designating information of minimum one page to maximum several tens of pages depending on the memory capacity and print content of the character codes in the page store device 6-5 is formed in the PM index table 7-9, in a mode showing the actual print positions in a page or pages inclusive of the blank line. On the other hand, in the page store device 6-5, the character code group in each record transferred from the main store device 6-2 is successively stored in a mode in which the command code is normally eliminated. The character code group successively stored in the page store device 6-5 does not include a record in which only the blank character codes forming a blank line are arranged, and a blank line is pre-stored at a specific location 6-25 within the page store device 6-5 and the line leading bite address of such blank line is repetitively used in the PM index table, thus saving the memory capacity of the page store device 6-5.

If the record read out from the main store device 6-2 and the succeeding record are character code groups for variable data, the command code for each record is interpreted and another PM index table distinct from the index table 7-9 is prepared in the main store device 6-2 and character code groups are successively stored in the page store device 6-5' normally in a state in which the command code has been eliminated.

That is, the difference in treatment between the character code for variable data and the character code for fixed data is that there are the PM index tables in the main store device in their own way, that the fixed data is transferred to the page store device 6-5, whereas the variable data is transferred to the page store device 6-5', and that the content of the page store device in which fixed data is stored during the series of printing operations in the same format is not rewritten, whereas the contents of the PM index table and the page store device 6-5' for the variable data are successively rewritten into information representing new pages as the printing operation progresses. The other points, namely, the manner in which the PM index table is prepared, the manner in which information is transferred to the page store device 6-5 or 6-5' and the manner in which the printing operation is effected by the first subcontrol device 6-6 or 6-6' and the second sub-control device 6-9 or 6-9', are entirely the same between the variable data and the fixed data.

Therefore, although the primed numbers are used for the variable data and the unprimed numbers are used for the fixed data in the foregoing description, it is of course possible to use the primed numbers for the fixed data and the unprimed numbers for the variable data.

The CG index table read out from the main store device 6-2, as shown by 6-51 in FIG. 7, is written into an appropriate memory location within the page store device 6-5 and the remaining character bit pattern groups are successively loaded into the rewritable character generator 6-10.

For example, in FIG. 7, bit pattern signals are stored in such a manner that the bit pattern signal of the character pattern A corresponding to the character code 41 is stored in the area 7-21, the bit pattern signal of the character pattern B corresponding to the character code 42 is stored in the area 7-22, and the bit pattern signal of the character pattern C corresponding to the character code 43 is stored in the area 7-23. However, this order of storage need not always follow the order of the character codes but any order is possible.

The CG index table 6-51 stores the address representing the leading bit of the character bit pattern about each character stored in the character generator 6-10 and the character display style designating information designating the vertical and horizontal construction of the said character bit pattern and the space bit construction to be printed in addition to the character.

Figure 12:
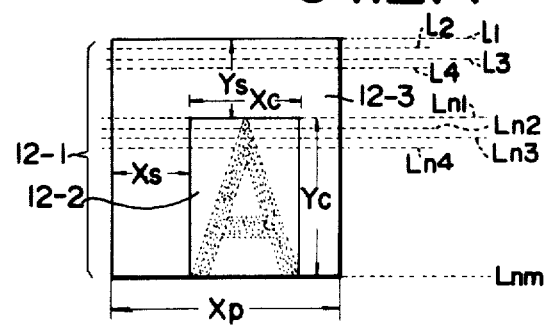
FIGS. 12A and 12B illustrate the character display style information stored in the character display style storage portion shown in FIG. 11 and the construction of the character pattern cell designated by that information.

Further describing the character display style designating information with reference to FIG. 12, one character to be printed in the present embodiment has the construction as shown in FIG. 12A. More specifically, the box 12-1 of the whole character including the blank portion determining the interval with respect to an adjacent character (hereinafter referred to as character pattern cell) includes the portion actually stored in the rewritable character generator (6-10), namely, the portion 12-2 which may be both a black bit and a white bit depending on the content of the storage in the character generator (hereinafter referred to as the real pattern portion) and the blank portion having a surrounding white bit independently of the rewritable character generator (hereinafter referred to as the imaginary pattern portion).

The construction of the above-described pattern cell is expressed by the information directly or indirectly representing five kinds of bit numbers $X_p$, $X_x$, $X_c$, $Y_s$ and $Y_c$ as shown in FIG. 12A. A plurality of sets of these five kinds of information is stored in a character display style storing portion 8-6 to be described, as shown in FIG. 12B, and depending on the kind of the character display style designating information entered (e.g., the information 0, 1, 2, 3, . . . as shown), one of these sets is selected and outputted.

The leading bite address of the character bit pattern within the character generator 6-10 and the set of the character display style designating information of the character bit pattern are stored in the CG index table 6-51 in the order of the character codes. For example, if the character A is expressed by a sextodecimal code 41, the display style designating information of the bit pattern stored in the area 7-21 of the character generator 6-10 is stored in the area 7-51 (bite area) of the CG index table 6-51, and the leading bit address 7-21' of the area 7-21 of the character generator 6-10 is stored in the remaining three bite areas. If the character B is expressed by a code 42, the display style designating information of the bit pattern stored in the area 7-22 of the character generator 6-10 is stored in the next area 7-53 (one bite area) of the CG index table 6-51, and the leading bite address 7-22' of the area 7-22 is stored in the remaining three bite areas of the area 7-52. In the CG index table, four bites each are successively arranged in the order of character codes in the manner similar to that described above. Therefore, in the CG index table, if the character codes are stored in such a manner that the character code 41 is stored in the addresses 164–167 and the character code 42 is stored in the addresses 168–171, then the CG index corresponding to these character codes can be read out by quadrupling the character code. Therefore, if the character code is found, the 4-bite area corresponding to this character code may be found out from the CG index table 6-15, and the bit pattern address corresponding to the display style information may be known from the found 4-bit information, thereby obtaining a bit pattern corresponding to the character code.

If there is no corresponding character bit pattern for a certain character code or if it is not necessary to load the rewritable character generator 6-10, then those character bit patterns are not loaded but only the character bit patterns for necessary character codes are successively loaded into the rewritable character generator 6-10 without gap. Therefore, it is not necessary to load unnecessary character bit pattern or a suitable bit pattern occupying a storage location within the rewritable character generator to waste the storage capacity of the rewritable character generator.

In the CG index table, even if a character bit pattern corresponding to a character code is not loaded, the set of the leading bite address of a character bit pattern and character display style designating information, namely, CG index information is loded into the CG index table mechanically successively in the order of codes of four bites each. In this case, unused character codes may be of any content. Arranging the CG index information successively in the order of character codes is necessary as the means for knowing the address of the character bit pattern corrresponding to the character code within the rewritable character generator 6-10.

When a certain character code is given, the CG index information is fixed to be four bites for each character code and is regularly arranged in the order of character codes and from this, the corresponding CG index information can be easily read out from within the CG index table 6-51.

Of the CG index information for a certain character code, 7-51 is a 1 bite of the character display style designating information, 7-55 is the most significant 8 bits of the leading bite address of a character pattern corresponding to that character code in the rewritable character generator 6-10, 7-56 is the middle 8 bits, and 7-57 is the least significant 8 bits.

The CG index table and character bit pattern are prepared in advance such that the leading bite address in the CG index table can show the leading bite address of any character bit pattern and therefore, the condition is satisfied that the CG index table and character bit pattern group always make a set and be treated as single character bit pattern information, whereby the aforementioned CG index table shows a proper address.

If the record read out from the main store device 6-2 and the succeeding record are the character bit pattern information used for the printing of variable data, the character bit pattern information number information of the character bit pattern information is transferred to another storage location in the main store device 6-2 and the CG index table is loaded into a suitable storage location within the page store device 6-5', and the remaining character bit pattern groups are successively loaded into the rewritable character generator 6-10'. In the other points, the mode of operation is just the same as that in the case of the character bit pattern information for fixed data.

After all the necessary character bit pattern groups are loaded into the rewritable character generators 6-10 and 6-10' and character code groups of more than one page are stored in the page store devices 6-5 and 6-5', the main control device 6-1, the first sub-control devices 6-6 and 6-6' and the second sub-control device 6-9 and 6-9' are operated in accordance with the horizontal and vertical synchronous signals entered into the second sub-control devices 6-9 and 6-9' from the printer 4-2 through the data output terminal 6-23 and the first control line 6-20, so that the series bit pattern signals are sent to the printer 4-2 through the sixth data line 6-19 and the print data output terminal 6-23 to cause the printer 4-2 to print a desired image.

Devices 6-5, 6-6, 6-7, 6-8, 6-9, 6-10, 6-11, 6-15, 6-16, 6-17, 6-18, 6-21 and 6-22 and devices 6-5', 6-6', 6-7', 6-8', 6-9', 6-10', 6-11', 6-15', 6-16', 6-17', 6-18', 6-21' and 6-22' are operated substantially at the same time in the printing operation which will hereinafter be described and are similar in mode of operation. Therefore, the operations of the devices indicated by unprimed numbers will be described herein and the description of the devices indicated by the primed numbers is omitted.

In the foregoing description, an example in which the PM index table is prepared by the main control device has been taken up, but such control is not always necessary and the PM index information, CG index information, the character code groups to be stored in the area 6-52, and the information to be stored in the variable character generator may be prearranged on a magnetic tape in an order to be stored, and the information read out from such magnetic tape may be stored in the CG index table, the area 6-52 and the variable character generator, respectively.

Before the printing operation for one page is started, the line leading bite address corresponding to the first line on a page to be printed and the line pitch designating information are first taken out from the PM index table within the main store device 6-2 by the main control device 6-1, and then said line reading bite address is set to an address counter for the page store device 6-5 within the first sub-control device 6-6, so that the line pitch designating information is set to a line pitch register formed in a portion of the first line buffer 6-7.

Thus, when the preparation for arranging the information on the first line in the first line buffer 6-7 has been made, the main control device 6-1 instructs the first control device 6-6 that it should start the job of transferring the first line information within the page memory device 6-5 to the first line buffer.

In accordance with the preset address of the page store device 6-5, the first sub-control device 6-6 takes out the character code of the first column of the first line from the page store device 6-5, and in accordance with the character code, takes out the leading bite address of the character bit pattern in the rewritable character generator 6-10 corresponding to that character code and the character display style designating information of the character, from the CG index table 7-15 in the page store device 6-5, and causes them to be stored at an address-designated location of the first line buffer which is preset.

The address of the page store device 6-5 preset in accordance with the PM index table is imparted to the page store device by the second control line 6-21 and the character code taken out from the page store device 6-5 is read into the first sub-control device 6-6 through the second data line 6-15. The character code from the page store device 6-5 is quadrupled by the first sub-control device and access is made to the CG index table with the quadrupled value as the address, whereby the leading bite address of the character bit pattern in the rewritable character generator 6-10 corresponding to that character code and the character display style designating information of that character are taken out from the CG index table and loaded into the first line buffer through the second data line 6-15.

When the CG index information of the first column in the first line has been loaded into the first line buffer 6-7, the address counter for the page store device 6-5 in the in the first sub-control device 6-6 and the address counter for the first line buffer are advanced by 1 address, respectively, and the CG index information of the second column is loaded into the first line buffer in the same manner as is the CG index information of the first column. The first sub-control device 6-6 and its operation will later be described.

When all the CG index information of the first line has been prepared in the first line buffer in the same manner as described, the main control device 6-1 instructs the second sub-control device 6-9 that it should start printing of the page.

The second sub-control device 6-9 takes out the CG index information from the leading address of the first line buffer in accordance with the print start instruction from the main control device 6-1 and the vertical and horizontal synchronous signals from the printer 4-2, and makes access to the rewritable character generator 6-10 in accordance with the CG index information to take out the character bit pattern by 1 bite each, and convert the same into time sequence serial bit pattern signals by a parallel-series converter 6-11 and imparts it to a mixer 6-12.

The address for reading out the CG index information from the first line buffer 6-7 is imparted from the second sub-control device 6-9 to the first line buffer 6-7 by the third control line 6-22, and the CG index information read out from the first line buffer 6-7 is read into the second sub-control device 6-9. In accordance with the CG index information from the first line buffer 6-7, the address of the rewritable character generator 6-10 is imparted to the rewritable character generator 6-10 through the third control line 6-22 by the second sub-control device 6-9. The character bit pattern from the rewritable character generator 6-10 is loaded into the parallel-series converter 6-11 through the fourth data line 6-17 in parallel by 1 bite each (8 bits), and the character bit pattern of 1 bite is converted into series bit pattern signals in the parallel-series converter 6-11 in accordance with the image delivery clock signal generated from the second sub-control device 6-9 in synchronism with the horizontal synchronous signal and imparted to the parallel-series converter 6-11 through the third control line 6-22, and is imparted to a mixer 6-12 through the fifth data line 6-18.

The second auxiliary control device 6-9 and its operation with later be described.

To the mixer 6-12, there is imparted the series bit pattern signal of the variable data, namely, the series bit pattern signal from the devices given the primed reference numbers, through the fifth data line 6-18' and mixed or summed in the mixer 6-12, and the combined series bit pattern signals are imparted as print data to the printer 4-2 through the sixth data line 6-19 and the print data output terminal 6-23.

The second sub-control device 6-9 successively reads out the CG index information from the first line buffer and in accordance therewith, the print data is put out from the print data output terminal 6-23 and during that while, the first sub-control device 6-6 prepares the CG index information of the second line for the second line buffer 6-8 in the same manner as for the first line buffer 6-7.

When having delivered the series bit pattern signals of the horizontal scanning line number in accordance with the line pitch designating information imparted for the first line, the second sub-control device 6-9 communicates that fact to the main control device 6-1 through the first control line 6-20 and takes out the CG index information from the second line buffer 6-8 to operate the rewritable character generator 6-10 and the parallel-series converter 6-11 to start printing of the second line.

When it knows that the printing of the first line has been completed, the main control device 6-1 instructs the first sub-control device 6-6 to cause the first line buffer to prepare the CG index information of the third line, and the first sub-control device 6-6 prepares the CG index information of the third line in the first line buffer 6-7.

When the printing of the second line has been completed, the second sub-control device 6-9 reads out CG index information from the first line buffer 6-7 to thereby start printing of the third line and informs the main control device 6-1 that the printing of the second line has been completed.

Knowing the completion of the printing of the second line, the main control device 6-1 causes the first sub-control device 6-6 to prepare the CG index information of the fourth line in the second line buffer 6-8.

In a like manner, the first line buffer 6-7 and the second line buffer 6-8 and the first sub-control device 6-6 and the second sub-control device 6-9 alternately makes access to thereby complete the printing of one page.

If the data of the next page has been prepared in the page store device 6-5 at the point of time whereat the printing of one page has been completed or at a point of time immediately before the completion of the printing, the main control device 6-1 causes the first sub-control device 6-6 and the second sub-control device 6-9 to start printing of the next page and if the data of the next page has not yet been prepared, the main control device causes the first 6-6 and the second sub-control device 6-9 to start printing of the next page at a point of time whereat the data of the next page has been prepared.

Reference is now had to FIGS. 8, 9, 10, 11 and 12 to fully describe the printing operation chiefly of the first sub-control device 6-6 and the second sub-control device 6-9.

Figure 8:
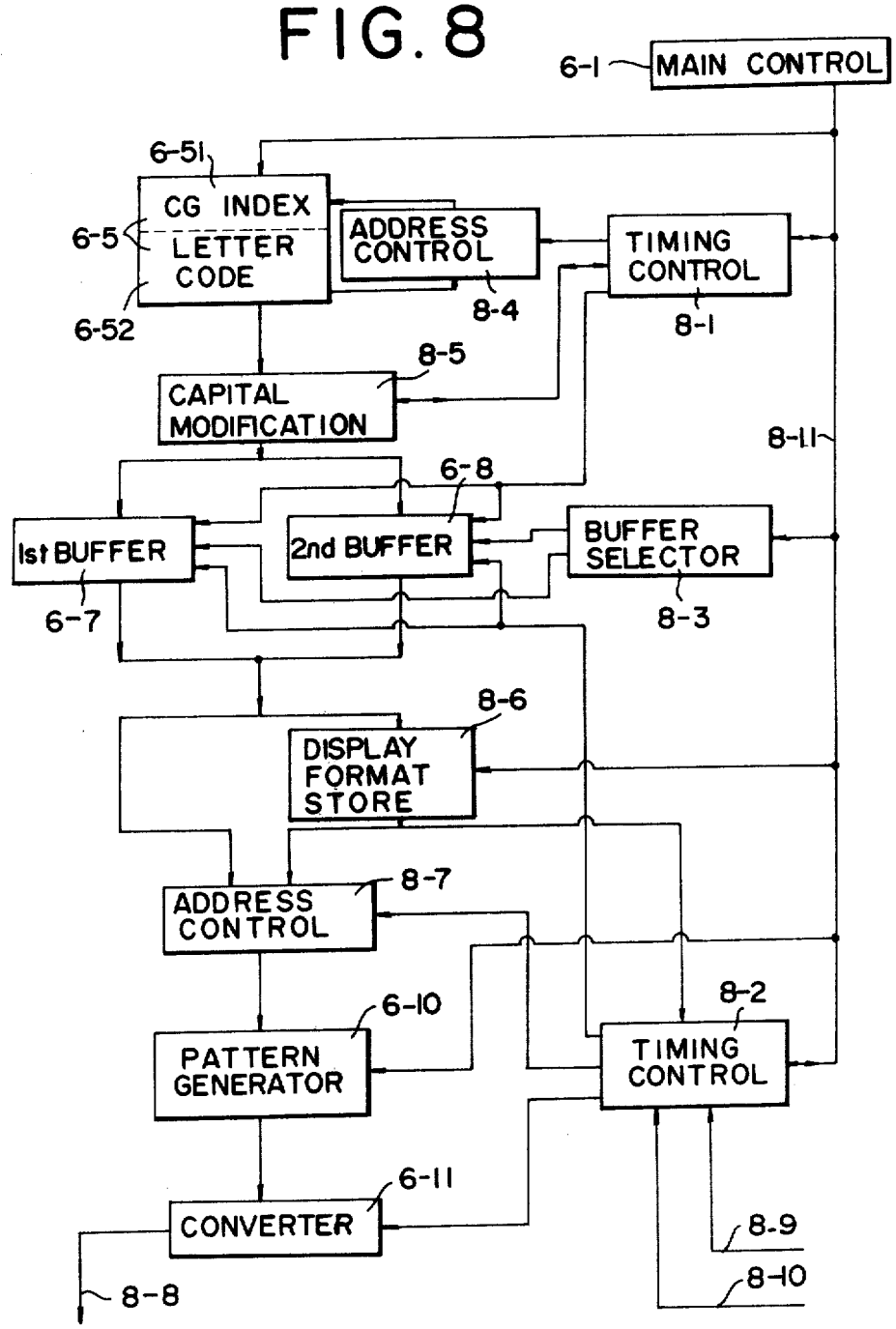
FIG. 8 is a block diagram for illustrating the operations of the first sub-control device and the second sub-control device shown in FIG. 6.

FIG. 8 shows in block diagram the embodiment of the operating portion of the present invention. This block diagram includes the page store device 6-5 of FIG. 6, the first line buffer 6-7, the second line buffer 6-8, the character generator 6-10 and the parallel-series converter 6-11, and unshown portion is of the same construction as that of FIG. 6. The parts functionally similar to those in FIG. 6 are given similar reference numbers.

In FIG. 8, the page store device 6-5 is divided into a portion 6-52 for storing the character codes of at least one page as already described (this portion will hereinafter be referred to as the character code portion) and a storage portion 6-51 of the CG index table comprising four bites of sets for obtaining the character pattern information corresponding to each character code (this portion will hereinafter be referred to as CG index portion). Each four bites of the CG index portion 6-51, namely, the CG index information, includes one bite representing the information designating the character display style as already mentioned (hereinafter referred to as the character display style designating information) and three bites for showing from which address position in the rewritable character generator the character bit pattern is stored (hereinafter referred to the CG leading bite address). The address control portion 8-4 is a device for designating the address of the character code portion 6-52 of the page store device 6-5 and for address-designating the CG index portion 6-51 of the page store device 6-5 with the read-out character code subjected to a suitable operation (for example, character code quadrupled) as the address.

The first line buffer 6-7 and the second line buffer 6-8 change over the write side and the read side each time the printing of one line is completed, as already noted, and the change-over operation is effected by a control signal from the main control device 6-1 through a line buffer selector 8-3.

When printing of a certain line is being effected, the second sub-control device 6-9 puts out series bit pattern signal from the content of the buffer on the read side through the rewritable character generator 6-10, etc., and on the other hand, during that while, CG index information on the next one line is entered from the CG index portion of the page store device 6-5 into the line buffer on the write side. At this time, if the character is one for which capital letter designation is present, capital letter designating bit is additionally entered into the line buffer by a capital letter modifier portion 8-5. A line buffer transfer timing control portion 8-1 is a device for controlling the timing from the reading of the page store device 6-5 to the writing of the line buffer, and is coupled to the main control device 6-1 through a main control device connector line 8-11.

The CG index information read out from the line buffer on the read side is applied to a character display style memory portion 8-6 and a character generator address converter 8-7. The character display style store portion is constructed as shown in FIG. 12B and prestores various styles in such a manner that the character display style having a set of Xp, Xs, Xa, Ys, Ya is stored at the area 12-5, the character display style having a set of Xpl, Xsl, Xcl, Ysl, Ycl is stored at the area 12-6, and the character display style having a set of Xpl, Xsl, Xcl, Ysl, Ycl is stored at the area 12-7, and is designed such that it can put out a corresponding character display style by applying the designating information (comprising 1 bite) 0, 1, 2, ... for designating these styles. Therefore, the character display style store portion 8-6 is addressed by 1 bite of the character display style designating information in the aforementioned CG index and puts out a specific character display style information of character bit pattern.

The character generator address converter 8-7 is for entering the character display style information and three bites representing the address of the rewritable character generator in the CG index information, namely, the CG leading bite address and for operationally treating the signal input from the vertical and horizontal timing control portion 8-2 to thereby address-designate the rewritable character generator 6-10 in accordance with the series bit pattern signal output timing.

The data output from the address-designated rewritable character generator 6-10 is applied in 8-bit parallel to the parallel-series converter 6-11, whereafter it becomes a series bit pattern signal 8-8 for each one bit by the image clock and is delivered into the printer 4-2 through the mixer 6-12 of FIG. 6.

The blocks of FIG. 8 described above operate in the following sequence during actual printing of one page.

When character code groups of at least one page are first written into the page store device 6-5 by the main control device, the main control device 6-5 puts out a line buffer transfer command to the line buffer transfer timing control portion 8-1. In response to the line buffer transfer command, the line buffer transfer timing control portion 8-1 imparts a control signal to the address control portion 8-4, the capital letter modifier portion 8-5 and further to one of the two line buffers which is on the write side to transfer from the page store device 6-5 to the line buffer on the write side the CG index information corresponding to the character codes of the first line to be printed on that page. When the CG index information of one line is so prepared in one of the line buffers, the line buffer transfer timing control portion 8-1 generates a transfer end signal to the main control device 6-1.

By this, the main control device gives an instruction to cause the printer 4-2 to generate vertical and horizontal synchronous signals and simultaneously therewith, reverses the conditions of the write side and the read side of the two line buffers.

In response to the vertical synchronous signal 8-9 from the printer, the vertical and horizontal timing control portion 8-2 enters one page image output operation and delivers series bit pattern signals of the first line successively to the printer 4-2 in accordance with the timing of the horizontal synchronous signal 8-10 delivered for each scanning of the laser beam in the printer 4-2. At this time, the CG index information of one character is read out from the line buffer on the read side, that is, that line buffer in which the CG index information of the first line has already been written, and a rewritable character display style store portion 8-6 is addressed by the character display style designating information included in the CG index information, so that one of the types of information concretely representing a plurality of character display styles included therein is selected and outputted into the character generator address converter 8-7.

Also applied to the character generator address converter 8-7 is the CG leading bite address of the CG index information of the first character read out from the line buffer, so that the address converter 8-7 successively delivers to the rewritable character generator 6-10 addresses corresponding to the first scanning line of the first character in the first line.

The content put out from the address-designated rewritable character generator 6-10 is delivered to the parallel-series converter 6-11 and becomes a series data under the control of the vertical and horizontal timing circuit 8-2, and is delivered to the printer 4-2 as a series bit pattern signal 8-8.

When the first scanning of the first character in the first line is thus completed, the content of the second character in the line buffer is read out and an image output is likewise effected for the first scanning of the second character in the first line. When the first scanning of the third character, the fourth character and so on is all completed, the content of the first character is again read out from the line buffer waiting for the next horizontal synchronous signal, and now a character bit pattern corresponding to the second scanning is generated. Likewise, when the second scanning of all characters is completed, the third scanning is entered and image output is effected for the fourth scanning, the fifth scanning and so on. When all the scanning of the first line have been completed, the vertical and horizontal timing control portion 8-2 puts out a one-line image output end signal to the main control device 6-1.

On the other hand, during the time when the first line image output is put out, the main control device 6-1 generates a second line buffer transfer instruction to the line buffer transfer timing control portion 8-1 and causes the CG index information of the characters of the second line to be transferred to the line buffer which is not being used for the reading of the first line, namely, the line buffer on the write side. Thereupon, the main control device 6-1, having received the line image output end signal, immediately reverses the write side and the read side of the two line buffers, whereby image outputs for the first scanning, the second scanning and so on of the second line can be put out from the next horizontal synchronous signal and the main control device instructs the line buffer transfer timing control portion 8-1 to transfer the CG index information of the characters in the third line to the line buffer now on the write side.

By repeating the above-described operation, the printing of the first line, the second line, the third line, . . . of one page is effected continuously and at the point of time whereat the printing of the last line has been terminated, the vertical and horizontal timing control portion 8-2 terminates the page print image output operation and waits for the arrival of the next vertical synchronous signal.

Figure 9:
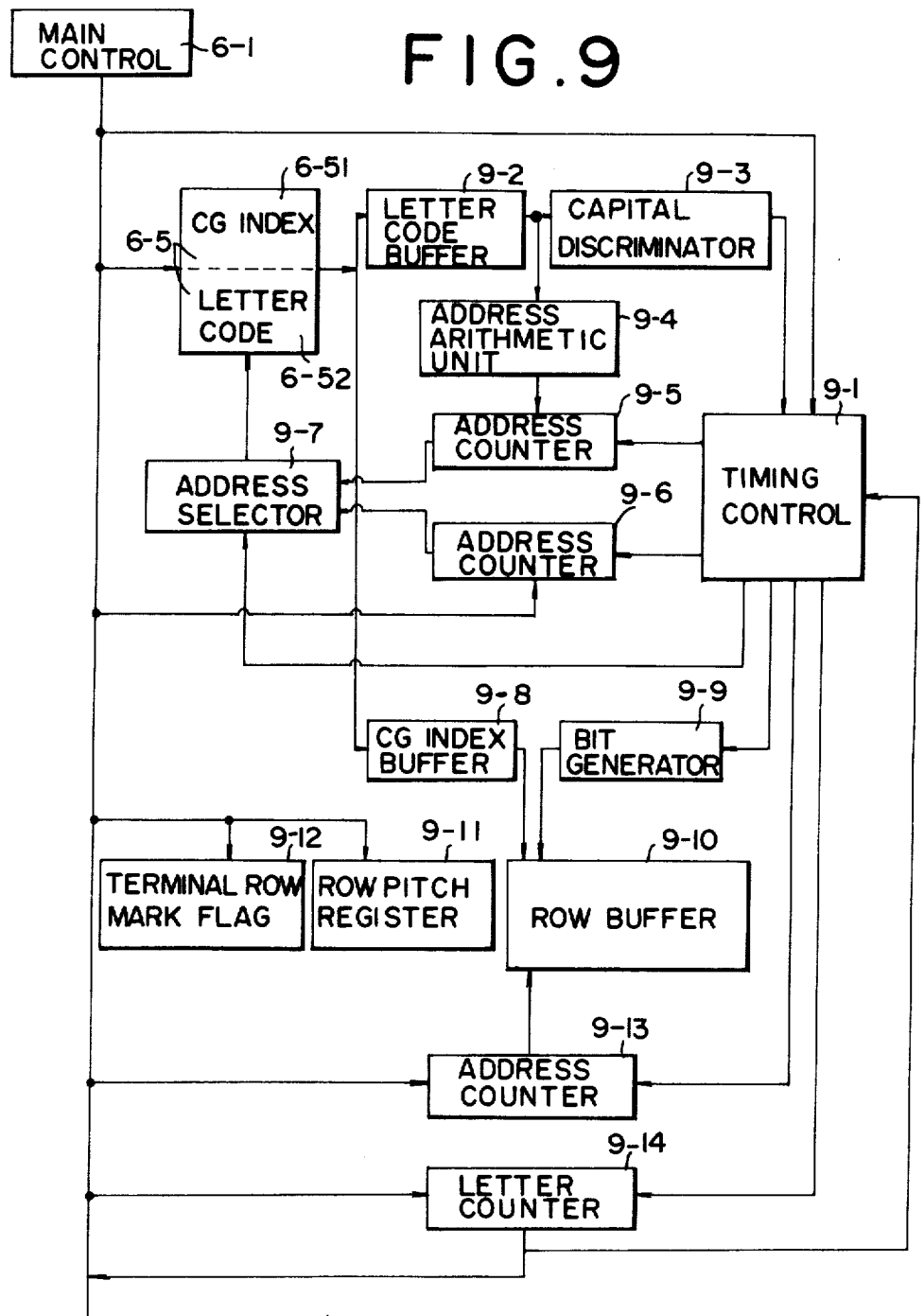
FIG. 9 is a more detailed block diagram for illustrating the operations of the storage device from reading to writing in the line buffer.
Figure 11:
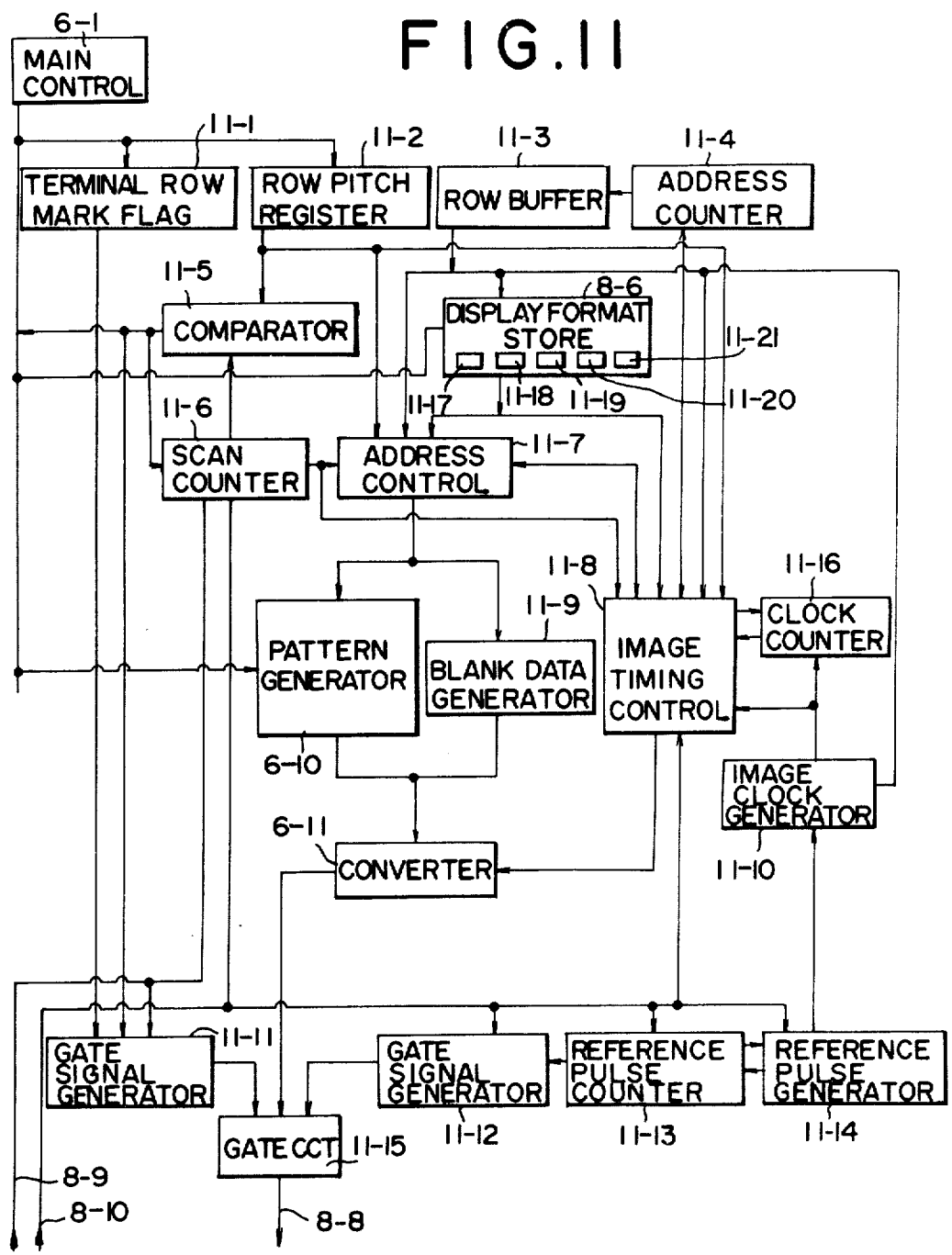
FIG. 11 is a more detailed block diagram for illustrating the operation from the reading of a line buffer to the provision of image signal output.

To clarify the features of the present invention in the above-described print image output operation, reference is now had to FIG. 9 to describe the line buffer writing operation and reference is also had to FIG. 11 to describe the operations from the line buffer reading to the image output.

FIG. 9 is a more detailed block diagram showing the portion for carrying out the reading of the page store device in the present embodiment and the process of writing into the line buffer corresponding to the content thereof, and the parts similar to those in FIGS. 6 and 8 are given similar reference characters and the portion not shown in FIG. 9 is of the same construction as the portion of FIGS. 6 and 8.

In FIG. 9, the process from the generation of the line buffer transfer instruction of the main control device 6-1 till the completion of the line buffer writing of one line is carried out in the manner which will hereinafter be described.

The line buffer transfer instruction sent from the main control device 6-1 is applied to a timing control portion 9-1 and simultaneously therewith or immediately before that, the main control device 6-1 applies instructions for line buffer transfer to a character code portion address counter 9-6, a line buffer writing address counter 9-13, and a line buffer writing character counter 9-14. More particularly, when the information from the line buffer is written in from the first, the address counter 9-13 stores the leading address of the line buffer and a set of characters corresponding to one line is set by the character counter. When the information is written in from the midway of the buffer, as described below, the address for starting the writing is stored in the address counter and a set of characters to be recorded is set by the character counter. Further, collaterally with the line buffer, an appropriate instruction or data is sent to two kinds of registers whose write side and read side are alternately reversed simultaneously with the line buffer, namely, last line mark flag 9-12 and line pitch information register 9-11. The last line mark flag shows that the line now written in the line buffer is the last line of a page, and during the preparation of recording data, the line pitch information of the last line and the data representing the last line are placed therein so that by detecting such data, it can be known that the line is the last line. The line pitch information register is a register which shows by how many scanning lines the line now written in the line buffer is formed and enables mixing of line pitches in a page which is a feature of the present invention, and it is referenced when the line buffer is later read out.

In response to the line buffer transfer command delivered from the main control device 6-1 with the above-described various instructions or data, the timing control portion 9-1 causes the page store address selector 9-7 to select the output of the character code address counter 9-6 to thereby designate the address of the page store device 6-5. The address in the page store device in which the character code of the first character of the present line has already been placed from the main control device 6-1 is applied to the character code portion address counter 9-6 and therefore, the address designation put out by the page store address selector 9-7 designates the address of the character code of the first character in the line.

As already described, the present embodiment has been described with respect to the case of the fixed data treatment in which a character code is represented by 1 bite (8 bits), and the character code of the first character read out by the address is temporally stored in the character code buffer 9-2.

Where the character code is represented by two bites (16 bits) unlike the present embodiment, the first of the two bites of the character code is read out by designating the address, and the first bite is temporarily stored in the character code buffer 9-2.

Subsequently, the timing control portion 9-1 increases the count of the character code portion address counter 9-6 to thereby address the second bite of the character code of the first character and causes the content thereof to be again transferred to the character code buffer 9-2. At this stage, the character code of the first character is completely stored in the character code buffer 9-2.

As the next step after the character code has been so stored in the buffer, the aforementioned CG index information corresponding to that character code is read out, but prior to this, whether the character code now read out is a special code which shows a capital letter upper portion or a capital letter lower portion is judged by the capital letter discriminator 9-3.

The capital letter expansion means the following function. A capital letter special code, unlike the character codes for the ordinary characters, is a kind of prescribed special code and there are capital letter upper special codes and capital letter lower special codes. When character code data groups are entered from a computer or a magnetic tape device, if the capital letter upper or lower special code is inserted before an ordinary character code beforehand, the present printer operates to print the upper or lower half of a character represented by the character code immediately after the special code by expanding such half to double size. If this operation is effected two times to print the upper half of the designated character in the upper line by doubling that half and to print the lower half of the designated character in the lower line by doubling that half, that character can be printed completely at a double size. Of course, the double size is not the only possible expansion, but printing at three or four times the original size is possible.

For the formation of such capital letters, see Japanese patent application No. 21911/1976 (US patent application Ser. No. 771,468). Turning to FIG. 9, the capital letter discriminator 9-3 determines whether the character code of the first character placed in the character code buffer 9-2 is a special code of capital letter upper portion or capital letter lower portion, and delivers the result to the timing control portion 9-1. If the information delivered to the character code buffer 9-2 is not a character code but a special code representing a capital letter, the timing control portion 9-1 further increases the count of the character code portion address counter to read out the succeeding character code representing the capital letter and re-places the read character code into the character code buffer 9-2. If the first read character code is not a special code representing a capital letter, the described operation for the capital letter special code does not take place.

Next, the address operator 9-4 effects a suitable operation (for example, quadrupling) on the character code stored in the character code buffer 9-2 and the result is applied to the CG index portion address counter 9-5. The result of the operation shows the address in which is stored the first bite of the 4-bite CG index information corresponding to the said character code in the CG index portion 6-51 within the page store device 6-5.

When a suitable value is entered in the CG index portion address counter 9-5, the timing control portion 9-1 causes the page store device address selector 9-7 to select the address of the CG index portion and progressively increases the count of the CG index portion address counter 9-5 while causing the CG index information 4-bite corresponding to the first character to be entered into the CG index buffer 9-8.

Figure 10:
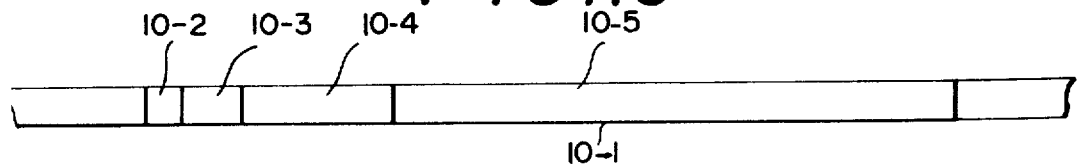
FIG. 10 illustrates an example of the specific content of CG index information about a character to be written into a line buffer.

Further, the timing control portion 9-1 writes the content of the CG index buffer 9-8 into a line buffer 9-10 address-designated by a line buffer write address counter 9-13 and if the character accompanies a capital letter upper or lower portion special code, the timing control portion instructs a capital letter designation bit generator 9-9 to write the information corresponding thereto into the line buffer. More specifically, as shown in FIG. 10, the CG index 10-1 about a character at an address of the line buffer consists of 2-bit capital letter designating information 10-3, character display style designating information 10-4, CG leading bite address 10-5 and parity bit 10-2.

As a result of the fact that the form information has been decoded from the main control device 6-1, as already noted, the address of the line buffer writing start position is already applied to the line buffer writing address counter 9-13. Therefore, when the writing of the first character is started from this position and moreover this line buffer is read later, the reading is started from the first address of the line buffer and therefore, if CG index information representing a blank character is written into the whole area of the line buffer beforehand, the first character can be printed at an intermediate position of a line corresponding to the address written in the line buffer during actual printing. Thus, by varying the address of the line buffer writing start position, the image printing horizontal position can be adjusted as desired.

When the CG index information of the first character is thus written into a designated address in the line buffer, the timing control portion 9-1 increases the count of the character code portion address counter 9-1 and the count of the line buffer writing address counter 9-13 and decreases the count of the line buffer writing character number counter 9-14, thereby starting the transfer of the second character.

In like manner, the CG index information of the third character, the fourth character and so on is successively transferred to the line buffer until the count of the line buffer writing character number counter 9-14 becomes zero, and at a point of time whereat the count has become zero, transfer end signal is put out to the main control device 6-1 and the timing control portion 9-1 stop transfer at this point of time and waits for the next transfer instruction to be put out.

Reference is now had to FIG. 11 to further describe the operation from the read-out of the line buffer to the image signal output portion.

FIG. 11 includes the read-side line buffer of the two line buffers in the embodiment of FIG. 8, the character display style store 8-6, the character generator address converter 8-7, the rewritable character generator 6-10, the parallel-series converter 6-11, and the vertical and horizontal timing control 8-2, and is a detailed block diagram of these. The parts not shown is of the same construction as FIGS. 6, 8 and 9. The part semilar to those in FIG. 6 or 8 are given similar reference characters.

In FIG. 11, the last line mark flag 11-1 and the pitch information register 11-2 are both designed such that the write side and the read side are alternately changed over collaterally with the line buffer 11-3, and only the read side line buffer set is shown in which suitable information is written as already explained.

Description will now be made of the process from the read-out of the line buffers in the present embodiment to the obtainment of series bit pattern signal 8-8 and the features thereof.

At the start of printing of one page, a vertical synchronous signal 8-9 is generated by the printer 4-2 in response to the instruction from the main control device 6-1, and the signal is directed to the scanning line counter 11-6 to reset the counter and renders the output of the vertical gate signal generator 11-11 to the logic "1" level to open the vertical gate circuit 11-15. The vertical gate signal is a signal applied to the gate circuit 11-15 for the purpose of supplying image signals to the printer only during the printing of one page (namely, during the period of time except the top and bottom margins and the right and left side margins of the page). Likewise, the horizontal gate signal is a signal for opening the gate of image signals only during the period of time for which printing is to be effected for one scan (namely, the period of time for which the laser beam scans the portion of the printing paper corresponding to the horizontal range to be printed), and it is generated by a horizontal gate signal generator 11-12.

With the vertical gate signal being in the state of "1", each unit starts operating to put out image signals upon arrival of the horizontal synchronous signal 8-10. The horizontal synchronous signal is first applied to the reference pulse generator 11-14, which in turn puts out a reference pulse of predetermined frequency which provides image clock and which is synchronous with the horizontal synchronous signal while, at the same time, the horizontal synchronous signal clears the count of the reference pulse counter 11-13. By the reference pulse counter 11-13 being so cleared, the gate circuit 11-15 is opened by the horizontal gate signal generator 11-12. The gate circuit 11-15 is later closed by the horizontal signal generator 11-12 when the output of the reference pulse counter 11-13 reaches a count corresponding to the point of time whereat the printing area scanning is terminated. However, the gate circuit may also be designed to be opened after the reference pulse counter 11-13 reaches a certain count.

The horizontal synchronous signal 8-10 is applied to the image timing control 11-8 to start the data processing from reading of the line buffer to the output of image signal.

At first, the count of the line buffer reading address counter 11-14 is cleared and then the CG index information of the first character stored in the zero address of the line buffer 11-3 is read out. The CG index information, as already noted, includes character display style designating information, CG leading bite address and 2 bits of capital letter designating information added during the writing of the line buffer. The character display style designating information is applied to the character display style store 8-6 so that the character display style data Xp, Xs, Xc, Ys and Yc are stored in buffer memories 11-7 to 11-21, respectively. The CG leading bite address is applied to the character generator address control 11-7, and the capital letter designating information is applied to the character generator address control 11-7, the image clock generator 11-10 and the image timing control 11-8. The character display style store 8-6 receives the input of the aforementioned designating information and puts out a concrete bit construction relating to the size or the like of the character pattern, and FIG. 12 shows an example of the content of the output information thereof.

The character display style designating information is included in the CG index information corresponding to the character code applied from a computer or a magnetic tape and therefore, by the main control device 6-1 rewriting the CG index information, it is possible to designate a distinct character or a distinct character pattern cell by the same character code, and it is also possible to rewrite part of the content of the character display style store 8-6 to thereby designate a character pattern cell in which the real pattern portion is the same and only the construction of the imaginary pattern portion differs, by the same character code. As a matter of course, it is also possible to obtain such a printing effect that the same character is obtained from a different character code.

Providing a table of CG index information, namely, CG index table in the page store device 6-5 and providing the character display style store 8-6 as in the present embodiment leads to a feature that the kind, the size, the pitch, etc. of the printed characters may be easily and quickly varied.

Also, the memory element of the rewritable character generator 6-10 can be saved by causing the rewritable character generator 6-10 to store only the real pattern portion insted of the character bit pattern of the entire character pattern cell and by causing some kinds of imaginary pattern portion information used for the time being to be stored in a brief form within the character display style store 8-6.

Further, the rewritable character generator 6-10 is not directly addressed from the character code but there is the CG index information intervening therebetween, so that even if the real pattern portion information of each character in the rewritable character generator 6-10 is of a variable length which leads to the diversity of the character display style, real pattern portion information of each character can be densely placed without gap and this means further saving of the memory element.

Turning back to FIG. 11, the character display style information put out from the character display style store 8-6 having the above-described function is applied to a character generator address control 11-7 and an image timing control 11-8.

In addition to that, the CG leading bite address and the capital letter designating information of the CG index information from the line buffer 11-3, the output from the scanning line counter 11-6 and the output from the line pitch information register 11-2 are applied to the character generator address control 11-7, and under these types of information, addresses are successively designated to the rewritable character generator 6-10 in accordance with the timing control of the image timing control 11-8. That is, the output LC of the scanning line counter 11-6 reporting what scanning line in a certain line is being scanned and the Ys of the buffer memory 11-20 are compared, and the output CC of the clock counter 11-16 which starts counting the image clock after the scanning of a certain character area has been started and the Xs and Xc+Xs of the buffer memory are compared and, if $LC < Ys$ or $Xc + Xs < CC < Xs$, then the blank data generator 11-9 is accessed by determining that the record is the record of the blank portion, while if $LC \leq Ys$ and $Xc + Xs \leq CC \leq Xs$, then the character generator 6-10 is accessed by determining that the record is the record of real pattern. The rewritable character generator 6-10 stores therein bit information of the real pattern portion of the character pattern cell in 8 bits each laterally from the left top bit, namely, one scan line in sets of 1 bite each, and subsequently stores the second scan line and the third scan line in the order to the right bottom bit. The CG leading bite address is information designating the leading bite of each character of the said real pattern portion and therefore, if it is the time for printing the first scan line of the real pattern portion, the character generator may be real from the CG leading bite address, but when other scan line portion is printed, it is necessary to alter the address designation to the rewritable character generator 6-10 by determining what number of scanning the scanning is.

Governing this operation is the character generator address control 11-7 and for this purpose, the count of the scanning line counter 11-6 and the information from the character display style store 8-6 are applied to the control 11-7.

At the start of one page printing, namely, at the first scanning of the first character in the first line, the image timing control 11-8 analyses the character display style information of the character in question and when the first scanning is started from the imaginary pattern portion, the character generator address control 11-7 is caused to address-designate to access the blank data generator 11-9. To select the blank data generator 11-9 to access it, if the most significant bit of the address put out by the character generator address control 11-7 is "0", the rewritable character generator 6-10 is selected to put out the content of the bite addressed by other less significant bit, and if the most significant bit is "1", the blank data generator 11-9 may be selected independently of the less significant bits, to put out the data of the entire bit "0".

The blank data so put out is applied to the parallel-series converter 6-11 upon the instruction from the image timing control 11-8 and converted into a series bit pattern signal of 1 bit each in accordance with the image clock and directed to the gate circuit 11-15.

If the first scan of the first character is the scanning of the imaginary pattern, the blank data of 8 bits unit is repetitively put out and at a point of time whereat the count of the character pattern clock counter 11-16 becomes coincident with the lateral width, namely, Xp, of the character pattern cell of the first character, the printing of the first scan of the second character is entered. However, the point of time of coincidence of the above-mentioned count need not be the break at which all the 8 bits of the blank data of 8 bits unit but may be an intermediate point of time.

Also, in the character pattern construction in which printing of the real pattern portion is effected from the midway or the beginning of the first scan of the first character, when the count of the character pattern clock counter 11-16 has reached a value corresponding to the position whereat the printing of the real pattern portion should be started, the image timing control 11-8 instructs the character generator address control to address the first bite of the first scan of the real pattern portion. The first bite is the CG leading bite address itself read out from the line buffer 11-3 as already noted, and accordingly, in addressing this bite, the character generator address control 11-7 puts out in CG bite leading address without modifying the same.

However, to access the rewritable character generator 6-10, the most significant bit "0" must be added, as already noted.

The content of the first bite of the first scan of the real pattern of the first character thus address-designated is applied to the parallel-series converter 6-11 upon the instruction from the image timing control 11-8 and converted into a series signal and directed to the gate circuit 11-15.

When all the eight bits are put out, the address output of the address output of the character generator address control 11-7 is increased for the output of the second bite of the first scan and the content of the second bite is again applied to the parallel-series converter 6-11. Likewise, the data of the third bite and of the fourth bite are successively put out and during that time, at a point of time whereat the count of the character pattern clock counter 11-16 has shown the termination of the real pattern portion, the image timing control 11-8 enters the mode of generating blank data and, when first scan of the first character has been terminated, the count of the line buffer reading address counter 11-4 to put out the CG index information of the second character and clear the character pattern clock counter 11-16, thus entering the printing of the second character.

Thereafter, in the same manner as described, the printing of the first scan of the second character, the third character and so on is effected, but if the designation of the capital letter upper portion or lower portion is included in the CG index information read out during that time, the image clock generator 11-10 operates such that the image clock determining the entire image output timing becomes half the frequency only during the printing of that character. This also holds true of the scanning of the second scanning line and so forth which will later be described. More particularly, as regards the horizontal expansion of a capital letter, it is realized only by change-over of the frequency of the image clock, and the vertical expansion is obtained by an operation in which the scanning line counter in one line is ½ in the character generator address control 11-7, as will be described later.

As the image output operation of the first scanning line of the first line progresses and the laser beam scan reaches the terminal end of a predetermined image printing area, the corresponding count of the reference pulse counter 11-13 is detected so that the horizontal gate signal generator 11-12 closes the horizontal gate in the gate circuit 11-15 and the image output of the first scan is terminated, but thereafter the reference pulse oscillator 11-14 stops putting out its pulse output and thus, the image clock also stops and the count of the scanning line counter 11-6 is increased and waits for the arrival of the next horizontal synchronous signal 8-10.

When the second horizontal synchronous signal is entered, the reference pulse starts to be put out in the same manner as that for the first time, so that the horizontal gate is opened and the line buffer reading address counter 11-4 is cleared and the CG index information of the first character is again read out.

The difference between the case of the first scanning and the case of the second and succeeding scanning is the manner in which the capital letter designation is responded to. Where there is a capital letter designation, the horizontal expansion can be realized by rendering the frequency of the image clock half, as noted above, but the vertical expansion requires the same data to be put out for two scanning lines each. That is, in the case of the capital letter upper portion designation, the data output is effected in such a manner that the ordinary first scanning data is put out during the first scanning and the second scanning and that the ordinary second scanning data is put out during the third scanning and the fourth scanning and thus, the upper half of the character pattern cell is expanded to two times by the scanning of one line, and in the case of the capital letter lower portion designation of the second line, the data output is effected in such a manner that the data of the first scanning of the lower half of the capital letter pattern cell is put out during the first scanning and the second scanning and that the data of the second scanning of the lower half of the capital letter pattern cell is put out during the third scanning and the fourth scanning and thus, the lower half of the character pattern cell is expanded to two times by the scanning of one line. To realize this operation, for example, in the case of the capital letter upper portion designation, the character generator address control 11-7 and the image timing control 11-8 judge as if the count of the scanning line counter 11-6 were ½ (the remainder is omitted), and can become operative to put out the image data of the resulting scanning line.

In the case of the capital letter lower portion designation, the content of the line pitch information register 11-2, namely, the number of scanning line forming the line, is added to the number of the scanning line in a line (that is, regarding that scanning of a line is continued from the line about it) and the sum is made into ½ (the remainder is omitted) and this result is judged as the scanning line in the line for the sake of convenience, thereby making the designation possible.

Next, there is another operation different from that in the case of the first scanning in putting out the image data of the second scanning of the first line. That is, when the character generator address control 11-7 causes the rewritable character generator 6-10 to put out the information if the real pattern portion of the character, the manner in which the address is designated differs.

Where the first character pattern cell of the first character is to print the information of the real pattern portion from the first scanning, namely, where Ys is 0, the information corresponding to the second scanning line of the real pattern portion must be put out in the second scanning. (As already described, however, when there is a capital letter designation, the second scanning is substantially judged as the first scanning and the operation similar to that in case of first scanning is effected). In such a case, to address the rewritable character generator 6-10, the character generator address control 11-7 does not directly address the rewritable character generator by the CG leading bite address but must add the number of the bites already read in the first scanning to the CG leading bite address and designate so as to start reading from the resulting address. This also holds true of the third and subsequent scanning, and in order to put out the information of the real pattern portion of the corresponding character in the scanning, the rewritable character generator 6-10 may be addressed by the result of the addition of the number of the bites read out before that scanning to the CG leading bite address of that character.

The above-described operation is effected in the character generator address control 11-7 under the substantial scanning line count and character display style information including the consideration of the capital letter designation and further under the CG leading bite address.

In the manner as described above, the printing of the second scanning, the third scanning, the fourth scanning and so on is effected and each time the scanning is completed, the count of the scanning line counter 11-6 is increased, but the output of this counter 11-6 is always compared with the output of the line pitch information register 11-2 by a comparator 11-5 and the printing of the first line is terminated at a point of time whereat the two outputs becomes coincident.

In the present invention, the line pitch information (Yp) can be designated independently of the character display style information (FIG. 12) and therefore, Ys+Yc of all the characters in a line (see FIG. 12A) is not always equal to the Yp. Thus, if a character Ys+Yc>Yp is present in that line, before all the pattern cells of that character are scanned and printed, a coincidence signal is put out from the comparator 11-5 of FIG. 11 to terminate the printing of that line and the lower portion of the pattern cell of that character can be omitted. If conversely, a character Ys+Yc<Yp is present in that line, the character generator address control 11-7 operates to select and generate a blank data as regards the scanning when the count of the scanning lines exceeds Ys+Yc during the printing of the character. Accordingly, an imaginary pattern portion is added to the lower portion of the pattern cell of that character.

Such function enables characters of different Ys+Yc to be present in each line and need not let all the characters in a line have the relation that Ys+Yc=Yp and so, eliminates the necessity of preparing characters having an exclusive character display style in accordance with the line pitch.

On the other hand, when the printing of one line is terminated, the coincidence signal from the comparator 11-5 clears the scanning line counter 11-6 to become ready for counting the scanning lines in the next line and sends one line print end signal to the main control device 6-1 to change over the set of line buffers and line pitch registers and the set of last line mark flags to the set which has so far been on the write side.

The main control device 6-1 changes over the set of the line buffers immediately before the next horizontal synchronous signal comes, and upon the arrival of the next horizontal synchronous signal, the printing of the second line within in the set of line buffers is started.

The second line is printed just in the same procedure as the first line and in the case of the capital letter designation, except the difference between the capital letter upper portion and the capital letter lower portion, printing is effected in the same manner as the first line by modifying the count of the scanning lines in the print line as already noted.

When the second line has been printed up, the third line, the fourth line and so on are printed and in the meantime, the vertical gate generator 11-11 sees the content of the last line mark flag each time the print end signal of one line is generated and when it has detected a mark that the line is the last line, the vertical gate generator closes the vertical gate at that point of time to terminate the whole printing of one page. The last line mark flag may be set only if the line is the last line of one page when the CG index information of one page is written into the line buffer by the main control device 6-1.

Thus, when one page printing is terminated, the apparatus of FIG. 11 waits for the input of the next vertical synchronous signal and starts printing of the next page.

While the construction of an embodiment of the display device of the present invention has been fully described, the present invention has a great flexibility in the relation between the input character code and the displayed character.

According to the present invention, even for the same character code, a character having a distinct character display style or a real pattern portion information can be displayed by rewriting the content of the CG index portion, namely, the character display style designating information and CG leading bite address.

For example, when display of one page is to be effected, if the character display style information and real pattern portion information corresponding to characters enlarged at the same magnification is pre-stored in the character display style store and the rewritable character generator in addition to the ordinary character display style information and real pattern portion information of all characters to be displayed in that page, the whole or part of the page displayed in ordinary size of capital letters can be readily enlarged and displayed by rewriting the whole or part of only the content of the CG index portion.

Reduction in size of letters can also be realized likewise and the enlargement or reduction may be done at any desired proportion.

Further, as a matter of course, the display of modified character style can also be readily realized.

When the set of CG index table and character bit pattern group is prepared beforehand, it is apparent that even the character code data input of the distinct character code systems (e.g. EBCDIC and ASCII) can be easily coped with by altering only the content of the CG index table.

While the construction of an embodiment of the display device of the present invention has been fully described, the present invention can readily change the relation between the input character codes and the displayed characters.

Figure 14:
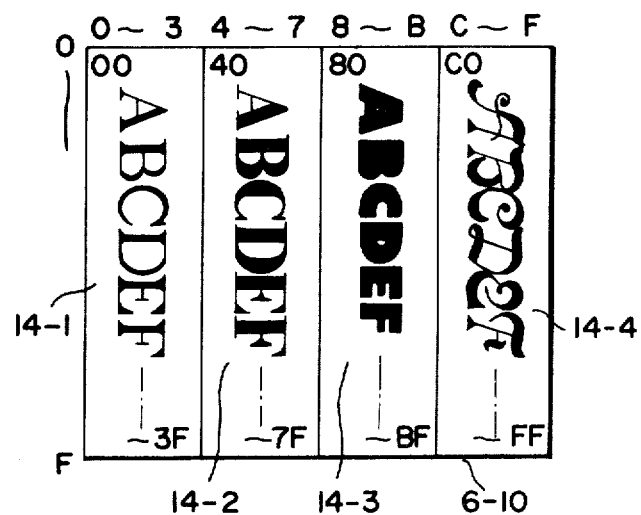
FIG. 14 illustrates a rewritable character generator.

For example, the same characters are displayed within the rewritable character generator 6-10 and, as shown at 14-1 to 14-4 in FIG. 14, four groups of different character bit patterns are prepared and the character form 14-1 is stored in the address 00-3F, the character form 14-2 in the address 40-7F, the character form 14-3 in the address 80-BF, and the character form 14-4 in the address Co-FF.

However, these addresses are not absolute addresses but relative addresses within the rewritable character generator 6-10.

More particularly, in the character forms 14-1, 14-2 and 14-4, one character is formed by 24×30 dots (90 bites), and the character form 14-3 is formed by 16×20 dots (40 bites), so that the actual addresses (real addresses) of the respective character forms differ from such relative addresses.

The aforementioned CG index table shows the relation between such relative addresses and such real addresses and the CG index information corresponding to each character stored in the rewritable character generator 6-10 is successively stored in an order corresponding to the aforementioned relative address, and the 3-bite address in the CG index information shows the aforementioned real address. However, since the present embodiment uses ASCII code, the CG index information for the alphabetical letters is stored such that it starts from the 41st (sexto-decimal). Thus, the CG index information relating to the characters after the character A of the character 14-1 from the 41st is stored. Accordingly, to read out the characters in the rewritable character generator, the relative address of that character may be quadrupled (because the CG index information is comprised of 4 bites) and the CG index information corresponding to that character may be designated, and the real address in the rewritable character generator may be designated by the 3-bite address included in this CG index information.

As shown in FIG. 14, four types of the same characters differing in character form are stored at distinct places within the rewritable character generator 6-10 and four types of CG index information relating to these characters are stored in the CG index table and a specific relation is imparted to the storage position of the four types of CG index information, whereby any of the four types of character patterns differing in character form may be selected for the same character code.

That is, as already described, the character form 14-1 (this character form is treated as the reference character form) is stored at the relative address 00-3F, the character form 14-2 at the relative address 40-7F, the character form 14-3 at the relative address 80-13F, and the character form 14-4 at the relative address Co-FF, so that the character form 14-2 may be obtained by adding 40 to the relative address of the reference character form, the character form 14-3 may be obtained by adding 80 to the relative address of the reference character form, and the character form 14-4 may be obtained by adding CO to the relative address of the reference character form. Accordingly, the reference character form can be designated in such a manner that when the character code 41 of the alphabetical letter A (which will herein after be described in connection with ASCII code) has come, designation is made of 4 bites relating to the CG index information on the character A of the reference character form 14-1 which is the 41st CG index information in the CG index table 7-15, and when the character code 42 of the character B has come, designation is made of the next 4 bites which is the 42nd CG index information, and since the other character forms have a predetermined relation with the reference character form, the character form 14-2 may be obtained in place of the reference character form by adding 40 to the character code, the character form 14-3 may be obtained by adding 80, and the character code 14-4 may be obtained by adding CO.

Of course, a predetermined number is subtracted from the character code depending on the places at which the character forms 14-2 to 14-4 are stored.

The addition or subtraction of specific values to or from any given character code may be accomplished when character code groups are transferred from the main store device 6-2 to the page store device 6-5 or when character codes are taken out from the character code portion 6-52 in the page store device 6-5 by the first sub-control device 6-6 and the CG index portion 6-51 is accessed. Where the first sub-control device 6-6 comprises a program control device such as microcomputer or minicomputer, such operation can be accomplished by the use of the operating function by the program of such program control device.

In the present embodiment, in order that the addition may be carried out at high speed, an adder is used in the midway of the transfer path from the main store device 6-2 to the page store device 6-5 to execute the addition.

Figure 13:
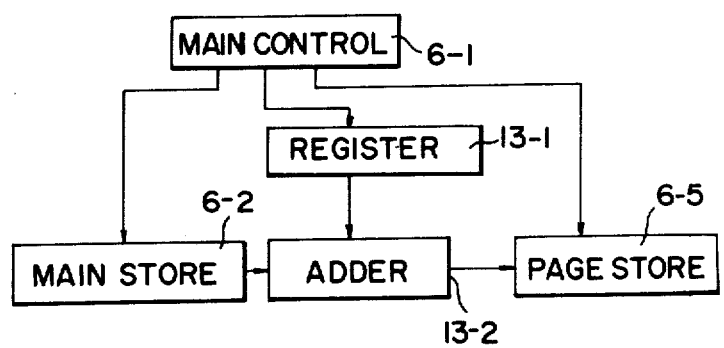
FIG. 13 is a block diagram showing the portion related to the conversion of the character code taken from the image signal processing portion.

FIG. 13 shows the main control device 6-1, the main store device 6-2 and the page store device 6-5 taken out from the image signal processor 4-3, and also the addition number register 13-1 and the adder 13-2 which have been omitted in FIG. 6.

In FIG. 13, prior to the transfer of the character code from the main store device 6-2 to the page store device 6-5, the main control device 6-1 loads the aforementioned specific value into the addition number register 13-1. The value so loaded into the register 13-1 is applied to the adder 13-2. Thereafter, the main control device 6-1 takes out a character code from the main store device 6-2 and enters it into the adder 13-2. The adder 13-2 sums the entered character code and the value loaded into the register 13-1 and applied to the adder 13-2, and transfers the resulting new character code to the page store device 6-5.

The adder 13-2 has only the function of effecting addition, but it is apparent that by loading a "complementary number of 2" of the value into the register 13-1, the result of a given character code minus the value is obtained.

By designating the character position in one page in which the value to be loaded into the addition number register and the character are to be converted by the character display style conversion designating information in the form information, the present invention can display characters in a display form which differs from the characters at the other position seven if the character codes given to characters at any positions in one page are identical.

That is, the present invention enables only the characters at specific positions in one page to be displayed in a distinct form or size.

Also, the present invention can print all the characters in one page in a varied size by designating the value to be loaded into the addition number register 13-1 and whether it should be loaded or not by the reduced scale designating information in the print control information.

More particularly, a new character code which is the result of a specific value added to all the character codes in one page can be obtained and character bit pattern groups displaying smaller characters are read out from the rewritable character generator 6-1 and printed to thereby enable reduced scale of the picture plane.

Expansion of the picture plane is also possible likewise, and moreover, the proportion of the reduction or the expansion may be selected as desired by suitably selecting the character bit pattern groups prepared in the rewritable character generator 6-10.

Thus, the present invention has a pronounced feature in terms of the printing function of characters differing in character display style by the same character codes and the function of reducing or expanding the picture plane.

What we claim is:

1. An information output apparatus comprising:
   dot pattern store means storing a plurality of sets of character dot patterns for displaying characters;
   position store means storing position signals representing the stored positions of the respective dot patterns stored in said dot pattern store means;
   signal forming means responsive to character code signals designating the character dot patterns to be put out for forming read-out signals for reading out from said position store means the position signals;
   read-out means for applying the position signal read out from said position store means by the read-out signal from said signal forming means to said dot pattern store means to read out from said dot pattern store means the character dot pattern stored in the position associated with the applied position signal; and
   output means for putting out as visible information the character dot pattern read out from said dot pattern store means by said read-out means.

2. An information output apparatus according to claim 1, wherein said signal forming means comprises an operating means for operating the character code signals to form said position read-out signals.

3. An information output apparatus according to claim 2, wherein said operating means comprises a multiplier means for multiplying said character code signals by a constant.

4. An information output apparatus according to claim 1, wherein said position store means comprises said position signals arranged in order if the character code signals.

5. An information output apparatus according to claim 1, wherein said output means comprises a laser beam recording device for deflecting and projecting onto a recording medium a laser beam modulated by said character dot patterns.

6. An information output apparatus according to claim 1, further comprising character code store means for storing therein the character code signals to be applied to said signal forming means by an amount corresponding to at least one page.

7. An information output apparatus according to claim 1, wherein said position store means comprises position signal store means storing therein said position signals and a buffer memory for applying read-out signals to thereby store the position signals read out from said position signal store means, and said read-out means comprises position signals read out from said buffer memory.

8. An information output apparatus comprising:
   dot pattern store means storing a plurality of sets of character dot patterns for displaying characters;
   position store means storing position signals representing the stored positions of the respective dot patterns stored in said dot pattern store means;
   character code store means for storing character code signals designating the character dot patterns to be put out;
   signal forming means responsive to the character code signals from said character code store means for forming read-out signals for reading out from said position store means the position signals;
   read out means for applying the position signal read out from said position store means by the read-out signal from said signal forming means to said dot pattern store means to read out from said dot pattern store means the character dot pattern stored in the position associated with the applied position signal; and
   output means for putting out as visible information the character dot pattern read out from said dot pattern store means by said read-out means.

9. An information output apparatus according to claim 8 wherein said character code store means stores a plurality of sets of character code signals each set in unit corresponding to one line of the visible information put out from said output means.

10. An information output apparatus according to claim 9 further comprises line memory means for storing position information of each of the plurality of sets of character code signals stored in said character code store means; and means for reading out the position information stored in said line memory and for reading out the set of character code signals associated with the read out position information from said line memory.

11. An information output apparatus comprising:
    dot pattern store means storing therein a plurality of sets of character dot patterns for displaying characters;
    store means storing therein position signals representing the stored position of the respective dot patterns stored in said dot pattern store means and style designating signals designating the display style of the respective dot patterns stored in said dot pattern store means;
    signal forming means for applying character code signals designating the character dot pattern to be put out to thereby form read-out signals for reading out from said store means the position signal on said dot pattern store means in which the dot patterns corresponding to said character code signals are stored, and the display designating signal of said dot pattern;
    read-out means for reading out the character dot patterns corresponding to said position signals from said dot pattern store means, said position signals being read out from said store means by said read-out means; and
    output means for putting out as visible information the character dot patterns read out by said read-out means.

12. An information output apparatus according to claim 11, wherein said signal forming means comprises an operating means for operating the character code signals to form said position read-out signals.

13. An information output apparatus according to claim 12, wherein said operating means comprises a multiplier means for multiplying said character code signals by a constant.

14. An information output apparatus according to claim 11, wherein said position store means comprises said position signals arranged in order of the character code signals.

15. An information output apparatus according to claim 11, wherein said store means has signal store means for storing a set of said position signals and said style designating signals, and a buffer memory for successively storing the sets of the position signals read out from said signal store means and the style designating signal.

16. An information output apparatus comprising:
    dot pattern store means storing therein a plurality of sets of character dot patterns for displaying characters;
    style store means storing therein style designating signals representing the display style of the dot patterns stored in said dot pattern store means;
    signal forming means for applying the character code signals designating the character dot pattern to be put out, to thereby form a read-out signal for reading out from said style store means the style designating signal corresponding to the character code signal;
    pattern read-out means for reading out from said dot pattern store means the character dot pattern corresponding to the character code signal in accordance with the style designating signal read out from said style store means; and
    output means for putting out as visible information the character dot pattern read out by said pattern read-out means.

17. An information output apparatus according to claim 16, wherein said style store means has data store means storing therein a plurality of style designating signals, and style signal store means for storing style signals representing the display patterns of the dot patterns and putting out a corresponding display pattern in response to said style designating signal applied thereto.

18. An information output apparatus according to claim 16, wherein said style store means comprises said style designating signals arranged in order of the character codes.

19. An information output apparatus according to claim 17, wherein said data store means has style designating signal store means storing therein style designating signals arranged in order of the character codes, and a buffer memory for temporally storing therein the style designating signals read out from said style designating signal store means in response to application of said read-out signals.

20. An information output apparatus according to claim 19, wherein said dot pattern store means stores therein the real pattern portion of the character dot pattern and said style signal store means stores therein blank portion information determining the blank portion for surrounding said real pattern.

* * * * *

UNITED STATES PATENT AND TRADEMARK OFFICE
CERTIFICATE OF CORRECTION

PATENT NO. : 4,234,931

DATED : November 18, 1980

INVENTOR(S) : KIYOSHI KANAIWA ET AL.

It is certified that error appears in the above—identified patent and that said Letters Patent is hereby corrected as shown below:

Column 1, line 13, after "to" (second occurrence), insert --as--; column 1, line 46, change "is" to --such as--.

Column 5, line 29, change "charge" to --charger--;

Column 8, line 21, "1-34" should read --1-35--.

Column 9, line 18, "As will apparent" should read --As will be apparent--; line 64, "1-53" should read --1-35--.

Column 10, line 22, "to"characters"" should read --to as "characters"--; line 26, "to variable date" should read --to as variable date--.

Column 13, line 34 "commande" should read --command--; line 35, "a information" should read --an information--.

Column 14, line 27, change "(" to --1--.

UNITED STATES PATENT AND TRADEMARK OFFICE
CERTIFICATE OF CORRECTION

PATENT NO. : 4,234,931  Page 2 of 2
DATED : November 18, 1980
INVENTOR(S) : KIYOSHI KANAIWA ET AL.

It is certified that error appears in the above—identified patent and that said Letters Patent is hereby corrected as shown below:

Column 20, line 7, delete "in the".

Column 22, line 4, after "to" insert --as--.

Column 28, line 61, "insted" should read --instead--.

Column 29, line 32, LC $\leq$Ys" should read --LC $\geq$Ys--; "Xc + Xs $\leq$ CC $\leq$ Xs" should read --Xc + Xs $\geq$ CC $\geq$ Xs--.

Column 29, lines 45 - 46; "when other" should read --when the other--; line 66, change "bite" to --bit--; same line, after "by, insert --the--.

Column 31, line 59, "line" should read --lines--.

Column 32, line 3, "if" should read --in--; same column, line 43, "becomes" should read --become--.

Column 33, line 11, delete "in".

IN CLAIMS

Column 36, line 53, "if the character" should read --of the character--.

Signed and Sealed this

Seventeenth Day of November 1981

[SEAL]

Attest:

GERALD J. MOSSINGHOFF

Attesting Officer  Commissioner of Patents and Trademarks